US011605225B2

(12) United States Patent
Floor et al.

(10) Patent No.: US 11,605,225 B2
(45) Date of Patent: *Mar. 14, 2023

(54) AUTOMATIC DETERMINATION AND MONITORING OF VEHICLES ON A RACETRACK WITH CORRESPONDING IMAGERY DATA FOR BROADCAST

(71) Applicant: SportsMEDIA Technology Corporation, Durham, NC (US)

(72) Inventors: Jeroen B. Floor, San Jose, CA (US); Paulus Weemaes, Campbell, CA (US)

(73) Assignee: SPORTSMEDIA TECHNOLOGY CORPORATION, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,616

(22) Filed: Apr. 7, 2022

(65) Prior Publication Data
US 2022/0230436 A1    Jul. 21, 2022

Related U.S. Application Data

(63) Continuation of application No. 16/037,403, filed on Jul. 17, 2018, now Pat. No. 11,301,685, which is a
(Continued)

(51) Int. Cl.
*G06V 20/40* (2022.01)
*G06T 7/20* (2017.01)
(Continued)

(52) U.S. Cl.
CPC ............ *G06V 20/42* (2022.01); *G06T 7/20* (2013.01); *G06V 20/52* (2022.01); *G06V 20/44* (2022.01); *H04N 5/247* (2013.01)

(58) Field of Classification Search
None
See application file for complete search history.

(56) References Cited

U.S. PATENT DOCUMENTS

| | | | | |
|---|---|---|---|---|
| 2002/0054210 | A1* | 5/2002 | Glier | G08G 1/164 348/E7.087 |
| 2003/0095186 | A1* | 5/2003 | Aman | A63B 24/0021 348/169 |

(Continued)

FOREIGN PATENT DOCUMENTS

EP    2150057 A2    2/2010

OTHER PUBLICATIONS

Werner Bailer et al: "Semi-Automatic Content Annotation" In: "Media Production, Delivery and Interaction for Platform Independent Systems", Dec. 19, 2013 (Dec. 19, 2013), John Wiley & Sons. Ltd. Chichester, UK, XP055279323, ISBN: 978-1-118-60533-2 pp. 166-208. DOI: 10.1002/9781118706350.ch5, section 5.6, section 5.3.3, section 5.4.3; figures 5.9-5.23.

*Primary Examiner* — Mikhail Itskovich
(74) *Attorney, Agent, or Firm* — Neo IP

(57) ABSTRACT

Methods and systems for automatically tracking and analyzing imagery data of at least one vehicle on a racetrack comprising. A video event management system with a plurality of video cameras positioned around a racetrack determines the presence of the at least one vehicle and based on a weighted event score corresponding to dynamics for the at least one vehicle and other objects captures video imagery and stills and generates at least one subframe. Excess video imagery data and excess stills data are discarded based on metadata of linked subframes.

19 Claims, 7 Drawing Sheets

Related U.S. Application Data continuation-in-part of application No. 14/677,759, filed on Apr. 2, 2015, now abandoned.

(51) Int. Cl.
*G06V 20/52* (2022.01)
*H04N 5/247* (2006.01)

(56) References Cited

U.S. PATENT DOCUMENTS

| | | |
|---|---|---|
| 2003/0185434 A1 | 10/2003 | Lee et al. |
| 2008/0284790 A1* | 11/2008 | Protola ............... G01B 11/26 345/582 |
| 2009/0257663 A1* | 10/2009 | Luo ..................... G06F 16/58 382/224 |
| 2010/0182436 A1 | 7/2010 | Boman et al. |
| 2010/0245532 A1 | 9/2010 | Kurtz et al. |
| 2013/0300832 A1 | 11/2013 | Hohteri et al. |
| 2015/0116501 A1* | 4/2015 | McCoy ............. H04N 5/23206 348/169 |
| 2016/0292865 A1 | 10/2016 | Floor et al. |
| 2018/0341812 A1 | 11/2018 | Floor et al. |

* cited by examiner

400

600

700

AUTOMATIC DETERMINATION AND MONITORING OF VEHICLES ON A RACETRACK WITH CORRESPONDING IMAGERY DATA FOR BROADCAST

CROSS-REFERENCE TO RELATED APPLICATIONS

This application is related to and claims priority from the following U.S. patents and patent applications. This application is a continuation of U.S. patent application Ser. No. 16/037,403, filed Jul. 17, 2018, which is a continuation-in-part of U.S. patent application Ser. No. 14/677,759, filed Apr. 2, 2015, each of which is incorporated herein by reference in its entirety.

BACKGROUND

There are many applications in which it is desirable to track and video record moving objects and/or moving persons while they are in a live event space (event venue). For example, cars and people may be tracked for security surveillance purposes along long stretches of roadways and walkways. Participants in various sport activities and/or vehicles or other objects connected to them may have their progress tracked for example along lengthy race courses. There are numerous problems that plague this lofty tracking goal. One is that there can be long extents of roadway and/or walkway and/or other stretches of event spaces where nothing of interest (e.g., no activity at all) is happening for very long spans of time and then, in a very short period, some episodic activity (e.g., one of significant interest) does happen, and it passes through the viewed area (e.g., patch of roadway) very quickly. A camera person has to be at the ready for that spot, at that time, and panning his or her camera at the right speed and appropriate direction to catch the speeding through person, vehicle or other object. There are numerous times when interesting episodes are not nicely caught on camera and recorded because at least one of the requirements is missed: the camera person is taking a break, the camera person is at his/her station but not ready, or not starting to pan from the right entry point into the scene of the object of potential interest, not panning at the right speed and/or not panning in the correct direction. Then again even if the camera operator is ready and doing all the right things, interesting episodic events will nonetheless be missed because there is an economic limit as to how many cameras and camera hookups (e.g., telecommunication connections, camera support platforms) and at-the-ready camera operators can be deployed for every spot in a given event venue; particularly when the event space is a relatively large one (e.g., one covering hundreds or more of square kilometers) and the event is of long duration (e.g., one that goes on for many hours of even days).

Another reason why episodic events of interest between long temporal stretches of nothing may not be caught and recorded as video footages is because of the sheer amount of storage capacity needed for recording all the imagery, including the video parts where nothing happens. A contemplated storage of all spots at all times can be economically prohibitive, especially when it comes to high quality video imagery.

It is to be understood that this background section is intended to merely provide useful introductory background for understanding the nature of the here disclosed technology and as such, this background section may include ideas, concepts or recognitions that were not part of what was known or appreciated by those skilled in the pertinent art prior to corresponding invention dates of subject matter disclosed herein.

DETAILED DESCRIPTION

Figure 1:
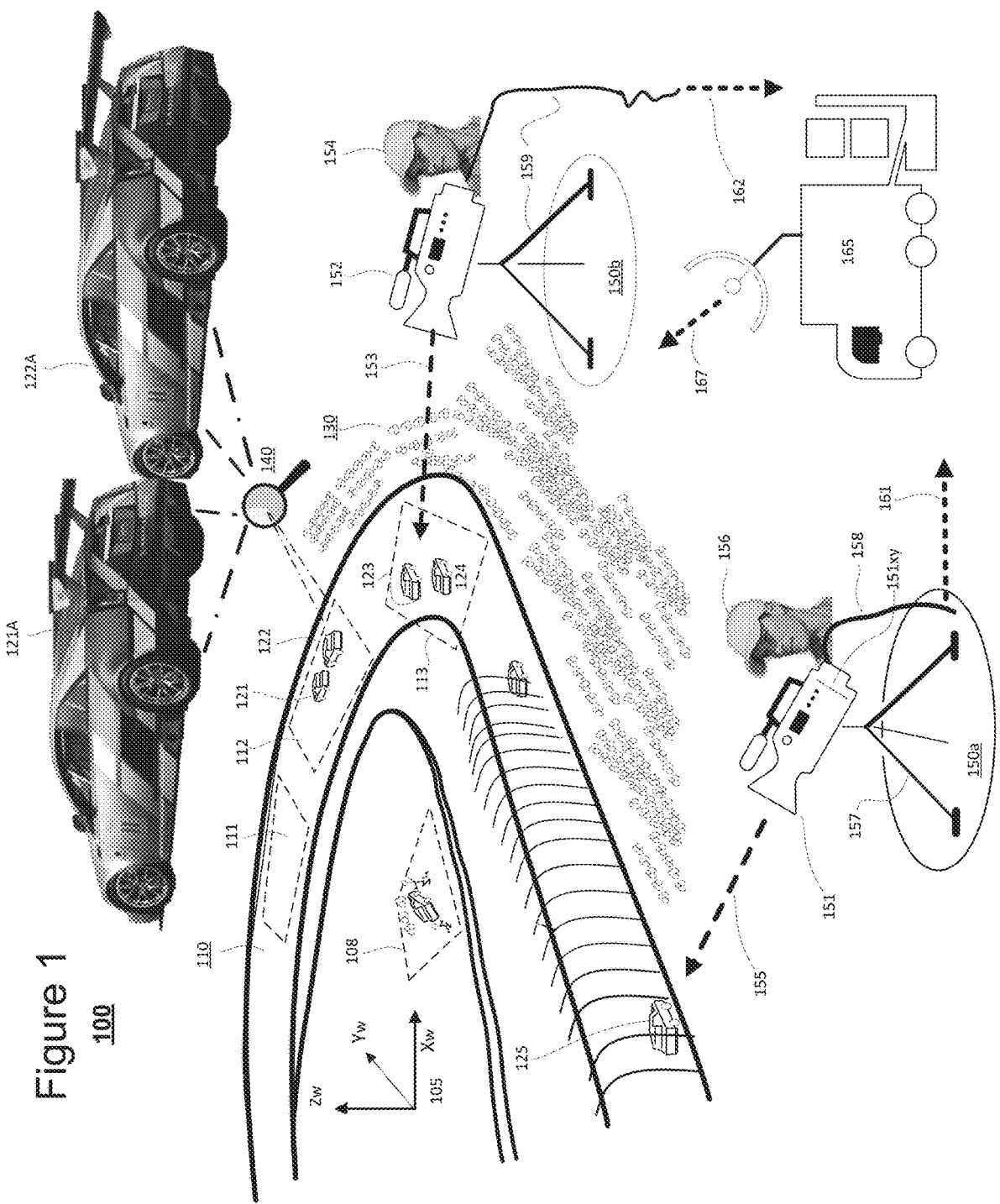
FIG. 1 depicts an example of a live sporting event that takes place over a relatively large expanse of space and/or a lengthy duration of time and is thus difficult to adequately cover with a limited number of video cameras, a limited number of camera operators and finite video storage space.

The present disclosure provides systems and methods for automatically surveying large spatial and/or temporal extents of a live and relatively large, pre-specified event space (event venue) and for automatically capturing as recorded video or as an episodic sequence of high quality snapshot pictures, episodic events, especially ones that may be of interest and occur within the relatively large event space and/or episodically within the long temporal duration of the event. The event space may be a pre-specified and relatively large event space such as a sports arena or race course or fairway that can accommodate many at-the-event spectators and can at the same time accommodate a large number of manned and pannable video cameras for covering respective scenery areas of the event space and broadcasting to at-home spectators, images captured from the respective scenery areas. The manned and pannable video cameras may have resolutions corresponding to normal resolutions of video monitors normally used by a general population of the at-home spectators. Each of the manned and pannable video cameras is configured to pan across a predetermined and respective scenery area of the pre-specified and relatively large event space so as to, for example, track moving objects of potential interest as they pass through the respective scenery areas. In the example where the event space is a race course, the moving objects of potential interest may be race cars. Because the pre-specified and relatively large event space has a large number of scenery areas in which objects of potential interest may present, a large number of the manned and pannable video cameras are required for covering all of the scenery areas in which objects of potential interest may present themselves.

In one embodiment, the present invention includes a method for automatically tracking and analyzing imagery data of at least one vehicle on a racetrack including providing a plurality of video cameras positioned around the racetrack with a combined field of view of a whole of the racetrack, wherein the plurality of video cameras are unmanned and are fixed with stationary fields of view, providing a video event management system including a processor, a memory, and a database, wherein the video event management system comprises an object locating and identifying unit and an event scoring unit, the video event management system performing the steps of: receiving video imagery from the plurality of video cameras, storing the video imagery and stills of the video imagery, the object locating and identifying unit performing the steps of: detecting imagery data of the at least one vehicle and based on the imagery data, determining vehicle dynamics including real-world positions, real-world velocities, camera image positions, and camera image velocities of both the at least one vehicle and at least one other object, wherein the at least one other object is at least one person, at least one other vehicle, or at least one group of vehicles, the event scoring unit performing the steps of: deriving an event score for the at least one vehicle based on a vehicle position, a vehicle operation status, a vehicle driver identity, and events determined from the vehicle dynamics, including a passing operation, a crash, a swerve, a spin, a rollover, loss of control, hard braking, or rapid acceleration, generating at least one subframe, determining an imminent vehicle entry into a field of view of one of the plurality of video cameras and based on the vehicle dynamics determining a direction and a point of entry of the at least one vehicle into the field of view of the one of the plurality of video cameras, generating at least one second subframe based on the imminent vehicle entry, wherein the at least one subframe and the at least one second subframe contain metadata indicating subframe metadata and vehicle metadata, including the event score, the vehicle dynamics, a subframe resolution, and subframe coordinates, wherein the subframe coordinates are constructed around the camera image positions of both the at least one vehicle and the at least one other object, and adjusting the subframe coordinates based on the vehicle dynamics, the video event management system further performing the steps of: linking the at least one subframe to the video imagery and the stills of the video imagery and discarding excess video imagery data and excess stills data of the linked video imagery and the linked stills of the video imagery based on the metadata.

In another embodiment, the present invention includes a system for automatically tracking and analyzing imagery data of at least one vehicle on a racetrack including a plurality of video cameras positioned around the racetrack with a combined field of view of a whole of the racetrack, wherein the plurality of video cameras are unmanned and are fixed with stationary fields of view, a video event management system including a processor, a memory, and a database, wherein the plurality of video cameras are constructed with 4K or larger capture resolutions, wherein the video event management system comprises an object locating and identifying unit and an event scoring unit, wherein the video event management system is operable to: receive video imagery from the plurality of video cameras, and store the video imagery and stills of the video imagery, wherein the object locating and identifying unit is operable to: detect imagery data of the at least one vehicle, and based on the imagery data, determine vehicle dynamics, including real-world positions, real-world velocities, camera image positions, and camera image velocities of both the at least one vehicle and at least one other object, wherein the at least one other object is at least one person, at least one other vehicle, or at least one group of vehicles, wherein the event scoring unit is operable to: derive an event score for the at least one vehicle based on the vehicle dynamics, generate at least one subframe, wherein the at least one subframe includes metadata indicating subframe metadata and vehicle metadata, including the event score, the vehicle dynamics, a subframe resolution, and subframe coordinates, and adjust the subframe coordinates based on the vehicle dynamics, wherein the video event management system is further operable to link the at least one subframe to the video imagery and the stills of the video imagery, and wherein the video event management system is further operable to discard excess video imagery data and excess stills data of the linked video imagery and the linked stills of the video imagery based on the metadata.

In yet another embodiment, the present invention includes a method for automatically tracking and analyzing imagery data of at least one vehicle on a racetrack including providing a plurality of video cameras positioned around the racetrack with a combined field of view of a whole of the racetrack, wherein the plurality of video cameras are unmanned, are constructed with 4K or larger capture resolutions, and are fixed with a stationary fields of view, providing a video event management system including a processor, a memory, and a database, wherein the video event management system comprises an object locating and identifying unit and an event scoring unit, the video event management system performing the steps of: receiving video imagery from the plurality of video cameras, and storing the video imagery and stills of the video imagery, the object locating and identifying unit performing the steps of: detecting imagery data of the at least one vehicle, and based on the imagery data, determining vehicle dynamics, including real-world positions, real-world velocities, camera image positions, and camera image velocities of both the at least one vehicle and at least one other object, wherein the at least one other object is at least one person, at least one other vehicle, or at least one group of vehicles, the event scoring unit performing the steps of: deriving an event score for the at least one vehicle based on the vehicle dynamics, generating at least one subframe, wherein the at least one subframe includes metadata indicating subframe metadata and vehicle metadata, including the event score, the vehicle dynamics, a subframe resolution, and subframe coordinates, and adjusting the subframe coordinates based on the vehicle dynamics, the video event management system further performing the steps of: linking the at least one subframe to the video imagery and the stills of the video imagery, and discarding excess video imagery data and excess stills data of the linked video imagery and the linked stills of the video imagery based on the metadata.

In one embodiment, unmanned video cameras of relatively high resolution (e.g., 4K ultra-high definition cameras or greater) are set up in substantially stationary positions to cover respective expanses of the large event space (e.g., the roadway of a long race track) over long periods of time. Vehicles and/or persons that are involved in use of the event space (e.g., a race track) and are pre-specified as being potentially worthy of interest are tracked for example by outfitting them with identity and/or position indicating devices and optionally also with automated performance reporting devices and episode occurrence indicating devices. All of the recorded video footages from the stationary high resolution cameras are temporarily kept in one or more storage buffers, automatically analyzed for content of potential interest (worthy of keeping) and then discarded if no portion of the recorded footage is determined to contain information of possible interest. Accordingly, storage capacity is not wasted on storing long stretches of video footage showing nothing of interest occurring for long stretches of time in covered scenery areas of the relatively large or other event spaces.

On the other hand, if one or more of the temporarily buffered footages is determined to contain an episodic event or other imagery of possible interest, a sub-area of the footage in which the episodic event/imagery-of-possible-interest is determined to have occurred, or is occurring, is framed and captured (kept, retained) while other sub-areas of the footage are discarded. In this way, the amount of storage needed for retaining footage containing events of possible interest is reduced and the potentially interesting parts of the initial footage are kept. (It is within the contemplation of the present disclosure and for some contextual situations to extract data from, or generate summarizing data about a temporarily kept sub-area of the footage, record the data and then discard the footage while retaining the data.)

Aside from a land-based race course used by race cars, the event space may be a water-based race area used by watercraft or an up-in-the-air space used by air crafts for performance skills demonstrations and/or competitive actions. The land-based race courses are not limited to those used by race cars and may include those used by long distance human or animal racers, by participants in multi-Athlon events, bikers (of the motor and/or pedaled kind), skiers, swimmers, sledders, golfers, and so on. Indeed, per the initial preface of the present disclosure, the present teachings can be applied to any event that calls for video footage where the event is of relatively long duration and/or occurs over a relatively large area that is to be surveyed for interesting actions but generally includes large portions in which nothing of interest happens for long periods of time and then an unexpected episodic event of potential interest happens in one of its many scenery areas, where the scenery areas ordinarily each require a pannable low resolution video camera to capture objects of potential interest passing through those scenery areas.

In one embodiment, each video frame of the utilized ultra-high definition cameras has a pixels organization corresponding to a 2-by-2 array of landscape oriented 1080 by 720 subframes of pixels. In other words, there are four such "1K" subframes each in contiguous abutment with at least one of the others. This arrangement is referred to, merely for sake of convenient shorthand, as a "4K" frame. The mere use herein of this shorthand is not intended to restrict the location within the 2160 pixels by 1440 pixels overall frame area of a 4K frame from where a desirable "1K" oriented "capture frame" is taken. More broadly, there is no requirement to restrict the location within the 2160 pixels by 1440 pixels area of a 4K frame from where a desirable "capture frame" of smaller (or equal to 4K at times) size is taken or to restrict the matrix organization of that capture frame (it need not be a 1K capture frame). For example, a "portrait" oriented capture frame of size 720 pixels horizontally and 1080 pixels vertically may be extracted from different spots within the horizontal 2160 pixels by vertical 1440 pixels expanse of the landscape oriented "4K" frame. In one embodiment, each of the 4K high definition video cameras operates at 30 frames per second or faster. It is within the contemplation of the present disclosure to have at least one of the high definition video cameras operating at 120 frames per second or more, and in one specific embodiment at 240 frames per second or more.

It is further within the contemplation of the present disclosure to use other configurations of ultra-high definition cameras which record other forms of ultra-high definition video frames. For example, a wide panoramic view ultra-high definition camera may record frames that can be each described as an array of 2-high by 4-wide, "1K" subframes; in other words, each frame is 4320 pixels wide by 2160 pixels tall. The per-frame size and/or pixels orientation of the ultra-high definition video frames in one or more of the utilized ultra-high definition cameras is not limited to being an N-high by M-wide multiple of "1K" subframes where N and M are whole numbers. The pixels need not be squares or 1×3 aspect ratio rectangles. Other values are possible and may be picked in accordance with specific application details and the size of the "capture frames" that are contemplated as being most practical for the intended application. In the exemplary race car case given below where a TV production crew is trying to capture made-for-television video footages of interest, a "1K" size and a landscape orientation (1080 by 720 pixels) is deemed appropriate for the capture frame. However, as mentioned, this should not be seen as limiting the teachings of the present disclosure.

Referring now to the automobile race track example of FIG. 1, a modern racetrack venue tends to be large and complex, with many different activities of potential interest taking place all about the expansive area of the venue and over long stretches of time. By way of example, the Daytona International Speedway of Daytona Beach, Fla. where the famed Daytona 500 race takes place each year has a 2.5 mile long, tri-oval shaped primary racetrack which is circled by race cars 200 times (200 laps) to finish a 500 mile long endurance high speed, "Daytona 500 ™" endurance race. Typically the race lasts about 4 to 5 hours start to finish. Bleachers are provided on the outer perimeter of the race track (e.g., 110 in FIG. 1), for example at the "Grandstand" to provide optimal spots from where fans (e.g., 130 in FIG. 1) can watch long expanses of the race track. Pit areas (e.g., 108 in FIG. 1) are provided inwardly of the racetrack where crews can rapidly repair racing cars, such as by replacing worn tires and refueling the race cars to get them back into the race. Episodic events of potential interest may occur anywhere and in any brief span of time during a car race.

Television camera crews are provided with platform areas at multiple spots about the raceway 100 and given opportunity to capture potentially exciting portions of the on-going live events. The example of FIG. 1 shows two 1K video cameras, 151 and 152, mounted on respective platforms 150a and 150b and manned by respective camera men 156 and 154. While for brevity sake, FIG. 1 shows just the two video cameras, 151 and 152, and just one scenery area out of an event space that has many additional such scenery areas, it is to be understood that in general the event space is so large as to require more than just the two video cameras, 151 and 152, for covering all the scenery areas of the event space in which objects of potential interest (e.g., race cars) may present themselves. The first camera man 156 has elected to point (155) his TV camera 151 at a sub-area of the viewable scenery that is occupied by only one race car 125 and to pan his camera 151 so as to follow just that one car 125. More specifically, the lens collar of the first TV camera 151 has a normal central line 155 thereof pointed at race car 125 such that after the corresponding imagery light passes through the corresponding lens system (not shown) an image of the pointed-to race car 125 will fall in focused form on an image sensing plate 151xy of the first TV camera 151. The image sensing plate 151xy has an array of color detecting sensors (e.g., a CCD array) disposed thereon for generating corresponding 1K video footage in which the pointed-to race car 125 is generally centered. Points of the image capture area of the camera's internal image sensing plate 151xy may be identified using Sx by Sy coordinates system where Sx designates a horizontal position of a respective pixel and Sy designates a vertical position of a respective pixel.

On the other hand, the second camera man 154 has chosen to point (153) his TV camera 152 at a viewable roadway sub-area 113 occupied by two race cars, 123 and 124 and to pan for following just that pair of close-to-one another race cars, 123 and 124. TV audiences (e.g., at-home general mass spectators, not shown) may find the video footage 162 coming out of second camera 152 to be the more interesting one because, for example, the two in-view cars, 123 and 124 might soon be in a fight with one another for who takes the lead, who gets the inside rail, the fuel-saving draft position, or who achieves some other competitively advantageous aspect of the car racing sport.

Unbeknownst to the second camera man 154, there is an even more interesting, live-action event developing in racetrack area 112 where an additional pair of race cars, 121 and 122 are neck and neck with one another and truly engaging in a fight for the lead. Magnification 140 shows the closeness of that competitive situation. However, the second camera man 154 cannot be everywhere at the same time and he must rely on gut judgment for determining what it is best to now focus his pannable 1K camera 151 on. Cars 123 and 124 are closer to his camera mount platform 150b and because of this he has chosen to focus on them.

Neither of the first and second camera men 156 and 154 can know ahead of time in such a fast paced and live-event venue where along the long stretches of roadway (e.g., in road patch area 112 rather than in 113) the more interesting camera shots will unfold. Big raceways can have large patches of roadway (e.g., area 111) where nothing at all is happening. Then they can have spots that are occupied by only a solitary car (e.g., 125) or many spread-apart spots (e.g., 112, 113) each occupied by its own cluster of cars. The two camera men 156 and 154 of FIG. 1 cannot be pointing (indicated by arrows 155 and 153) their respective TV cameras (151 and 152) everywhere at the same time. Moreover, they cannot be at the ready every second of a long duration event (e.g., one lasting one or a few hours). Human operators generally need periodic breaks.

One solution is to deploy more variably-pointed and cameraperson-operated TV cameras like 151 and 152 at yet more platform spots like 150a and 150b. A video management crew at a remote control center (not shown) receives all the respective video feeds (e.g., 161, 162) from the many cameras (only two shown as 151, 152) as relayed from an at-venue equipment truck or trailer 165 and linked by microwave communication (e.g., 167) and/or other telecommunication means to a production center. The remote video management crew makes the decisions as to which of the many video feeds (only two shown, 161-162) are to be broadcast live to the TV audience and/or which are to be video recorded for later replay. Additionally, the remote video management crew may instruct the many camera persons (only two shown, 154, 156) where to point their respective TV cameras and with what zoom or other camera settings.

A problem with the above solution is that, like the camera men, the remote video management crew cannot have their attention focused everywhere at the same time and all the time. They can easily miss an interesting episode taking place at an overlooked patch (e.g., 112) along the long raceway 110. Additionally, there is typically only a finite number of platform spots (e.g., 150a, 150b) that offer a good vantage point while allowing for required hookup (e.g., cabling 158) and mounting (e.g., gimbaled tri-pod 157) of the respective cameras. The equipment is expensive and the compensation for the many camera men (only two shown, 154, 156) is expensive. So the production crew is reluctant to deploy more than the minimum number of cameras and of camera persons that they deem necessary for capturing the essence of the event.

Figure 2:
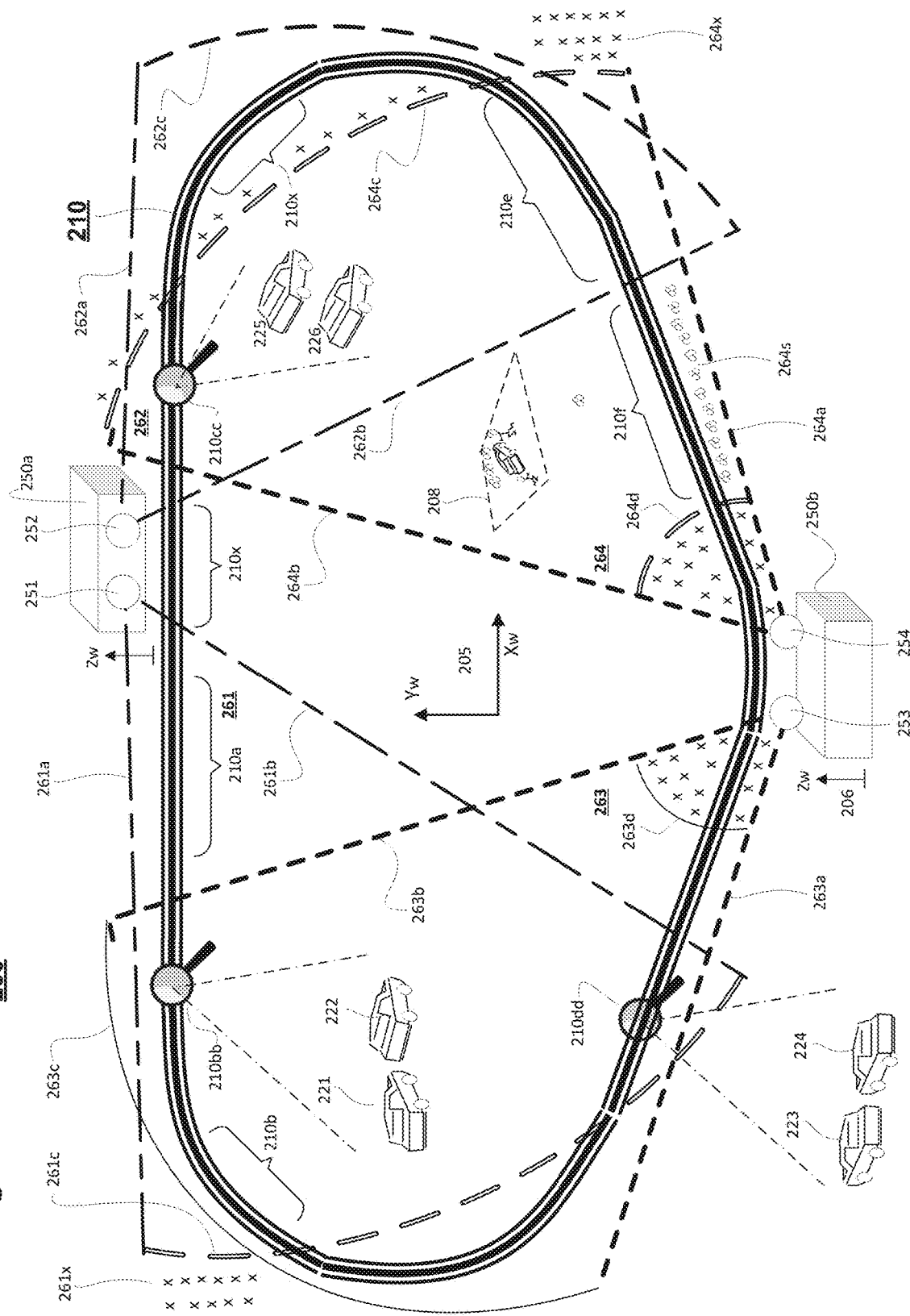
FIG. 2 provides a top plan view of a large event space such as one that may be present in the example case of FIG. 1, but where, in accordance with the present disclosure, unmanned high resolution video cameras are strategically placed to cover large expanses of area for such a venue over long periods of time and are automatically operated to catch video footage of passing through or other objects of potential interest.

Referring to FIG. 2, which is primarily a top plan view (with a few exceptions) of a race track 200 equipped in accordance with the present disclosure, shown here is an example where just four 4K video cameras are substantially fixedly disposed at elevated platform locations 251, 252, 253 and 254 and are configured to operate non-stop at least for the pre-specified duration of the race (e.g., 4-5 hours). The platform locations are elevated at a height Zw above the major lateral plane of the raceway 200. For convenience sake, the four 4K video cameras will be referenced by the same numbers as their respective platform locations 251, 252, 253 and 254. As explained above, a 4K video camera has an image capture plane that is a contiguous conglomeration of four 1080 pixels by 720 image capture areas organized as a 2-by-2 matrix. In one embodiment, the first and second 4K cameras, 251 and 252, are mounted in an elevated newscaster facility 250a of the raceway grandstand while the third and fourth 4K cameras, 253 and 254, are mounted in an upper tier of a building 250b located on an opposed side of the roadway 210. Camera 251 has a respective first three-dimensional (3D) scenery capturing cone 261 (denoted by cone boundaries 261a, 261b, 261c) that intersects with the relatively level terrain below it to pick up imagery present in the intersected terrain. That first scenery capturing cone 261 is aimed to cover at least the upper left quadrant of the venue space. Camera 252 has a respective second scenery capturing cone 262 (denoted by cone boundaries 262a, 262b, 262c) aimed to cover at least the upper right quadrant of the venue space. Similarly, camera 253 has a respective third scenery capturing cone 263 (denoted by cone boundaries 263a, 263b, 263c) aimed to cover at least the lower left quadrant of the venue space. It is within the contemplation of the present disclosure that instead of being conical, the scenery capture geometries can have other configurations such as those of frusto-conical or frusto-pyramidal (e.g., that of rectangular based pyramid but cut at top and bottom by respective cut off planes).

The theoretical viewing ranges (assuming no obstructions) of each of the four 4K video cameras may be depicted as a three-dimensional (3D) hypothetical cone tilted towards the major lateral plane of the raceway 200 and cutting through it. Parts of the raceway 200 outside of the hypothetical cut-through profile are outside the viewing range of the respective 4K camera. More specifically and as an example, the cut-through profile 264 of 4K camera 254 is depicted as having an outer-to-roadway, radial border line 264a, an inner-to-roadway, radial border line 264b (extending inside the area circumnavigated by the roadway 210), an outer range arc 264c and an inner range frustrating arc 264d. The area between the inner range arc 264d and the elevated mounting location 254 of 4K camera 254 is marked with "x" symbols to indicate that such is blind spot for that 4K camera 254 (for example due to a lens shield mounted ahead of the camera lens). The region radially beyond outer range arc 264c is also a blind spot for camera 254. The area between the inner range arc 263d and the elevated mounting location 253 of 4K camera 253 is similarly marked with "x" symbols to indicate that such is blind spot for that 4K camera 253. To avoid illustrative clutter, not all of the viewing ranges are so marked. It is of course within the contemplation of the disclosure to add more elevated 4K cameras (or 4+K cameras having greater resolution than 4K cameras) for covering areas of the race course 200 that are in blind spots of the exemplary four 4K cameras 251-254. Additionally, it is within the contemplation of the disclosure to use cameramen (e.g., 154, 156 of FIG. 1) with variably pointable 1K cameras (e.g., 151, 152) for covering parts of the roadway 210 such as 210x that are not covered by at least one of the four 4K cameras 251-254.

Instead of focusing on the few areas (e.g., 261x, 210x, 264x) that are not covered by the unmanned 4K cameras 251-254 of the given example, consider instead the race course areas that are covered by one or more of the 4K cameras. More specifically, assume that in roadway patch 210bb, race cars 221 and 222 are neck to neck. A frontal view of those race cars is included in the two-dimensional 4K scenery-viewing frames of camera 251. A side view of those race cars 221-222 is included in the two-dimensional 4K scenery-viewing frames of camera 253. Indeed, large stretches of the roadway 210 such as stretches 210e and 210f where nothing of interest is happening are also included within the scenery-viewing ranges of at least one of 4K cameras 252 and 254 as an example. Although at the moment nothing of interest is happening in those long stretches (e.g., 210a, 210b, 210e, 210f) and at the moment the interesting episodic events are occurring in smaller portions 210bb, 210cc and 210dd, the situation could flip to case where something of interest does happen in one of 210a, 210b, 210e and 210f. It will be explained soon below how the footage data corresponding to the currently boring long stretches (e.g., 210a, 210b, 210e, 210f) is selectively discarded and how the footage data corresponding to the potentially interesting portions (e.g., 210bb, 210cc, 210dd) is automatically identified, selectively centered within for example 1K framing borders and captured as stored 1K footage of possibly interesting activity. It is to be noted before delving into that aspect that the roadway 210 itself is not the only imagery that can be selectively captured and kept as interesting footage produced by the unmanned 4K cameras 251-254. Other, within-the-race course areas such as for example the pit stop areas 208 and spectator seating areas such as 264s may be included.

Figure 3:
FIG. 3 provides an exemplary camera view that can be provided by an exemplary 16K high definition video camera when aimed according to one of the conic scene coverage angles of the example of FIG. 2.

Referring to FIG. 3, shown here is an example 300 of imagery that might be captured by a so-called, 16K high definition video camera that is unmanned and substantially fixedly pointed at a particular section of a race course and kept running non-stop at least for the duration of the race. By 'substantially fixedly pointed', it is intended to include here unmanned cameras that are simply locked into place while on a fixed position tripod and also cameras that have some form of wind and/or vibration compensation mechanism that keep the camera steadily pointed to a predetermined portion of the racecourse even if subjected to heavy winds or other orientation change-urging forces. The track itself may have certain unique markers (registration points) disposed thereon that the camera automatically places within pre-specified portions of its 4-by-4 array of 1K subframes and/or appropriate software may be used to keep certain, identified-as-stationary features within the image as fixed in place within the 4-by-4 array boundaries of the camera's scenery-capture plate (e.g., an array of multicolored optoelectronic sensors for sensing lights of respective pixels, similar to 151xy of FIG. 1).

As may be appreciated from FIG. 3, moving objects such as vehicles and people may come into view within the substantially fixedly pointed-to scenery of the example 300 and/or may leave the 4-by-4 array boundaries of that pointed-to scenery or may be obstructed from view by introduction of an obstructing other object. For example, the race car within the dashed box surrounding a soon-to-be-created, tracking and floating subframe 310h is not yet wholly inside the 4-by-4 array boundaries of the illustrative example 300 but soon will come into its view based on state data obtained about that car including its current speed and direction in the 3D world. As another example, the race car within the solid rectangle denoting car-tracking and floating subframe 310c is still yet inside the 4-by-4 array boundaries of the illustrative example 300 but eventually it will pass through the currently-empty patch 310b of roadway and then disappear out of the 4-by-4 array boundaries of the illustrative example 300. It is to be noted that as the image of that lead car (of boxed area 310c) moves toward the top left edge of the camera's viewable scene area, its speed on the 2D image capture plate of the camera will appear to slow down. That is not because the car is slowing down but rather because it is moving farther away from the camera. In accordance with one aspect of the present disclosure, a tracking speed on the camera's sensors plate (not shown, see 151xy of FIG. 1) of the object tracking and floating subframe 310c automatically adjusts as the object of interest moves off into the distance or approaches so as to be closer to the camera.

In one embodiment, a velocity and position of a tracking and floating subframe is determined based on a tracking and floating subframe applied to a second video feed. For example, if a tracking and floating subframe is generated for a vehicle travelling along a race track and the vehicle approaches an edge of a field of view of a first camera, the velocity and position data of the tracking and floating subframe is retrieved by the system and transformed based on an angle and position of a "hand-off" second camera such that a subframe is operable to continuously and smoothly track a vehicle between two cameras. In one embodiment, coordinates for a tracking and floating subframe are continuously updated in a database and are operable to be read by an expert knowledge system.

In accordance with another aspect of the present disclosure, some portions of the temporarily recorded, 16K footage of illustrative example 300 are automatically discarded as is indicated by the angled hatchings (e.g., line 302). At the same time other portions of the temporarily recorded, 16K footage may be automatically determined as being worthwhile to not yet discard but rather to keep at least for a substantially longer time than the immediately discarded portions and to thereafter determine if the temporarily kept portions should be kept for even longer periods of time and optionally used by the sportscasters in their live commentary or post-race analysis of what transpired. Examples of the to be immediately discarded portions of the temporarily recorded, 16K footage include that of empty roadway portion 310b, empty roadway portion 310d, inactive pit area 308a and spectator area 330.

FIG. 3 is not all to scale and thus some of the illustrative examples of floating and object-tracking subframes like 310e are not drawn with same dimensions as that of solid rectangle denoting the 1K floating subframe 310c. The exemplary subframe 310c is intended to show an example where the height (measured in the Sy direction of reference frame 305) of the 1K floating subframe 310c is substantially in line with the normalized 1.0 height of a 1K frame as shown to the left of the 4-by-4 array while the left side of the rectangle representing the 1K floating subframe 310c is not inline with any of the normalized 0.0, 1.0, 2.0, or 3.0 lateral subdivision markers (of the Sx direction of reference frame 305) shown above the 4-by-4 array. The notion of a "floating" 1K subframe such as 310c is that it can be positioned anywhere within the boundaries of the 4-by-4 array as long as it is fully contained within those boundaries. Dashed rectangle 310h is an example of a soon-to-be included, 1K subframe whose 1K area is not yet fully contained within the 4-by-4 boundaries of the exemplary 16K high definition video camera and thus its full image contents cannot yet be captured by the 16K camera and stored in an appropriate analog or digital image storage buffer. In one embodiment, the 4K or higher high definition video cameras themselves produce digitized imagery and thus selected portions of their outputs can be stored directly into digital image storage buffers. If not, the analog outputs may be converted into digital form and the desired areas within the digitized frames may then be stored as the saved floating subframes. It should be noted that it is not necessary to immediately create floating subframes of imagery. It can be sufficient to initially define and record the location and size of a floating subframe over time as scene imagery is filmed and to, at a slightly later time generate the floating subframes of imagery based on the recorded definitions of the subframe boundaries as they are to appear over time in the initially filmed imagery. In other words, the process can be a pipelined one in which various signal conversions (e.g., video format conversions if needed) take place at sequentially delayed stages down the pipeline.

While the example of a 1K floating subframe (e.g., 310c of FIG. 3) is used here in the context of a television telecast of 1K footage to an audience having TV receivers configured to normally display such 1K footage, more generally speaking the present disclosure provides for telecast of J-by-K pixels footage to an audience having TV receivers or monitors configured to normally display such J-by-K pixels footage, where J and K are horizontal and vertical pixel counts and can be any appropriate set of numbers. The 1K embodiment of 1080 by 720 pixels is just an example. In accordance with the present disclosure, when the normal footage shot for example by on-scene cameramen using panned cameras is J-by-K pixels (e.g., 151 and 152 of FIG. 1), the unmanned and substantially fixed and high definition video cameras (e.g., 251 and 252 of FIG. 2) have an n*J-by-m*K pixels resolution where n and m have values greater than one and are preferably integers where at least one of the n and m values is two or greater. The "floating" of a J-by-K pixels subframe (e.g., subframe 310c) within the boundaries of the camera-captured n*J-by-m*K pixels image corresponds to a virtual cameraman panning a corresponding virtual J-by-K pixels camera about the in-view scenery of the camera; except that there is no physically panning cameraman present or a mechanically gimbaled and physical J-by-K pixels camera present. Instead the virtual panning of each virtual camera is performed by an automated machine means (e.g., a data processing machine executing corresponding software and having appropriate image processing hardware) so that the costs, potential mechanical problems and reliability issues associated with having many real cameraman and many mechanically gimbaled J-by-K pixels cameras is substantially reduced by replacing the same with the software-controlled and virtually panning, floating subframes (e.g., 310c, 310e, 310f, 310g and 310h of FIG. 3). For example, instead of having many electrical interconnects such as 158/161 of FIG. 1 on a one-for-one basis in terms of interconnects per camera and one gimballing mechanical mount such as 157 per camera, the configuration of FIGS. 2 and 3 provides use of a single interconnect for many non-mechanically panning, virtual cameras and avoids the cost and reliability issues associated with having plural real and mechanically panning cameras. Thus costs are reduced and reliability is increased. The example of FIG. 3 depicts a current four such automatically and non-mechanically panning, virtual cameras as represented by floating subframes 310c, 310e, 310f and 310g; where the not-yet-fully-inside subframe 310h represents a soon-to-be added fifth such automatically and non-mechanically panning, virtual camera. It is within the contemplation of the present disclosure to have a greater number of such virtual cameras implemented by each n*J-by-m*K pixels, high definition video camera (e.g., 253 and 254 of FIG. 2) or a fewer number.

It is to be noted that although the present disclosure repeatedly makes reference to n*J-by-m*K pixels, high definition video cameras and to floating subframes that are sized for example as J-by-K ones, these enumerations are merely for sake of providing easily understandable examples. More generally, the pixels array configuration of the fixedly mounted and continuously filming, higher definition video cameras can be any one that allows for creation of floating subframes that substitute in for pixels array configurations of panned and human operated lower resolution cameras. It is within the contemplation of the present disclosure for example that the substituted-for lower resolution cameras have pixel array configurations other than 1080*720 pixels (for example 1079*719 pixels) and that the higher definition, fixedly mounted and continuously filming video cameras have a larger pixels array configuration, but not necessarily ones whose parameters are integer multiples of those of the substituted-for lower resolution cameras. Additionally, the floating subframes can be made to be smaller than the full pixels array configurations of the substituted-for lower resolution cameras. More specifically, in one embodiment, so-called, 320*200 pixels, thumbnail clips may be cut out of the 4K screen for pasting together on a clipboard screen that shows simultaneously racing but far apart racecars as if they were running side by side. The floating subframes need not be rectangular. It is within the contemplation of the present disclosure that they can have a variety of other shapes, for example, that of a triangle, pentagon, hexagon or a higher order and not necessarily regular other polygon or shapes emulating circles, ovals or other shapes as deemed appropriate for different applications.

In addition to being 'floating' some of the floating subframes like 310e, 310f, 310g can overlap one another. Moreover, some of the floating subframes like 310e can contain more than one respective object of interest (e.g., plural moving race cars). To be potentially "of interest" a respective object of interest need not be moving. It could for example be a stationary race car being worked on within pit area 308a or it could, as yet another, but not limiting example, be a race car that has come to a stop or has crashed. So a question that begs answering here is how does the automated system of the present disclosure automatically determine that an in-scene object is potentially "of interest" or even that such an object is within the pointed-to scenery of a respective n*J-by-m*K pixels, high definition video camera (e.g., 251 of FIG. 2) and then where within that pointed-to scenery (what are the object's coordinates using the 2D scenery coordinates, Sx and Sy of reference frame 305)? Before answering those questions it is to be noted that in one embodiment, and by way of example for the race car denoted as 313e of floating subframe 310e, it may be desirable to keep the object of interest (e.g., 313e) inside an internal and centralized subarea 311e of the encompassing subframe 310e and to allow that internal subarea 311e to advance in a predetermined direction 312e and at a predetermined speed relative to the encompassing subframe 310e before advancing the encompassing subframe 310e in that same direction 312e or while advancing the encompassing subframe 310e at a slower speed. In this way the speed of the race car 313e relative to the roadway can be sensed by the TV audience in a manner different from how it would be perceived if the encompassing floating subframe 310e constantly and continuously kept pace with the race car 313e. The decision to do one instead of the other can be implemented by means of an automated expert knowledge database system that mimics (or exceeds) the know-how of a human camera operator (to at least some extent) as will be detailed later below. In one embodiment, the expert knowledge system includes a video event management system including a processor, a memory, and a database, wherein the video event management system comprises an object locating and identifying unit and an event scoring unit. The video event management system is operable to perform the steps of receiving video imagery from the plurality of video cameras and storing the video imagery and stills of the video imagery.

Figure 4:
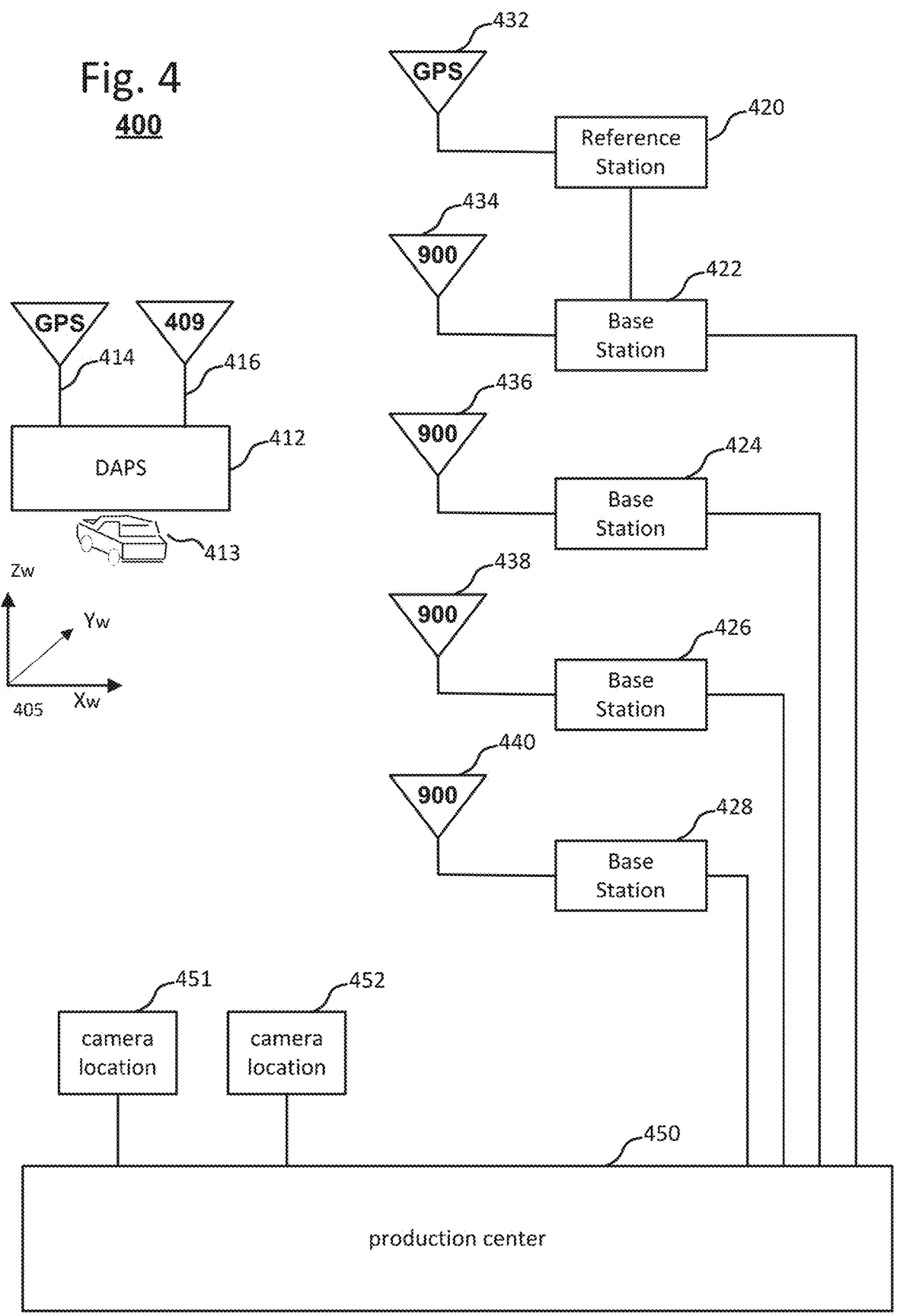
FIG. 4 depicts an exemplary system for keeping track of the whereabouts and interestingness/worthiness states of moving or other objects of potential interest that are distributed about a wide area event space.

Referring to FIG. 4, one way of automatically determining where an object of potential interest is relative to a pointed-to scene (e.g., that of FIG. 3) is to automatically keep track of where objects of potential interest (e.g., pre-identified objects/persons likely to be of interest) are within a three-dimensional (3D) reference frame 405 that is grounded to the real world and whether those three-dimensional (3D) coordinates correspond to two-dimensional (2D) scenery coordinates (e.g., Sx, Sy) found within the scenery bounds of a pointed-to scene of a given one of the unmanned 4K or better high definition video cameras. (It is alternatively or additionally within the contemplation of the present disclosure to instead map from a 2D real world coordinates system that constitutes a plan view of the terrain as taken from above—e.g., from a hovering drone such as 613 of FIG. 6—to the 2D scenery capture coordinates (e.g., Sx, Sy) of a given n*J-by-m*K pixels, high definition video camera.) Moreover, even if an in-scene object of potential interest is identified as being in-scene, further information may be acquired and used to automatically determine if the in-scene object is potentially of interest due for example to its current speed or lack of speed, its tilt angle, its closeness to other objects of potential interest, its direction of travel, its operating temperature and/or other such parameters that can indicate that an in-scene object is potentially of interest or not of interest. In some instances, the mere identity of the object (e.g., a uniquely designed racecar) and/or of persons (e.g., a celebrity racecar driver) within a given floating frame can increase or determine the worthy-to-keep rating score for that frame.

FIG. 4 provides a block diagram of one embodiment 400 that includes means for automatically determining where in a three-dimensional (3D) frame of reference 405 various objects of potential interest (e.g., pre-identified objects persons likely to be of interest) are located and for telemetry-wise relaying current state information about them to an automated, of-interest determining mechanism. More specifically, FIG. 4 shows one embodiment where a so-called, Data Acquisition and Positioning System (DAPS) 412 is attached to each object (e.g., race car 413) of potential interest. The DAPS 412 includes a GPS antenna 414 and a 900 MHz telemetry antenna 416. In one embodiment, the DAPS 412 is mounted on top (e.g., at a roof portion) of the object being tracked. In the embodiment pertaining to an automobile race 413, there will be a DAPS unit 412 mounted to each car being tracked and the unit will wirelessly relay at least the identity (e.g., racecar number) of the object it is mounted to. Thus, although FIG. 4 shows only one DAPS 412, the present disclosure contemplates using a plurality of such DAPS 412 units each respectively attached to a corresponding object of potential interest and each configured in accordance with the nature of that object of potential interest (not all of tracked objects need be race cars, for example one might be an ambulance). DAPS unit 412 includes a GPS receiver connected to the GPS antenna 414. GPS antenna 414 is used to receive signals from one or more in-line-of-sight GPS satellites. The 900 MHz telemetry antenna 416 is used to communicate with various, and at the moment receptive, base units (e.g. 422, 424, 426 and 428) distributed about the venue. In one embodiment, the system includes at least four base stations 422, 424, 426, 428. Base station 422 includes 900 MHz antenna 434, base station 424 includes 900 MHz antenna 436, base station 426 includes 900 MHz antenna 438 and base station 428 includes 900 MHz antenna 440. There can alternatively be more than four base stations or less than four base stations. It is contemplated that base stations will be located at spaced apart different parts of the racetrack (or other event venue). The base stations transmit data to and receive data from each of the DAPS units 412 via the 900 MHz antennas. In one embodiment, the real world location of each DAPS unit 412 as determined by its respective GPS receiver and the identity of the DAPS unit is automatically relayed (e.g., wirelessly) to a coordinates converter (not shown) which automatically converts the GPS-determined location information into local world coordinates information where the local world coordinates information is that which uses a three-dimensional (3D) coordinates frame of reference having its origin fixed to a predetermined point of the event space or that which uses a two-dimensional (2D) coordinates frame of reference having its origin fixed to a predetermined point of the event space and viewing the event space from above, for example as a top plan view of the event space terrain (but alternatively can be an angled from above plan view of the event space terrain). In an alternate embodiment, a vector system is used which operates with telemetry transmitted at 2.4 GHz rather than at 900 MHz.

Data from each of the base stations is communicated to a production center 450 using for example DSL modems and/or Fiber channel modems. FIG. 4 also shows 4K or greater thigh definition video camera platform locations 451 and 452. In various embodiments, there can be one HD camera location, two HD camera locations or more than two HD camera locations as well as normal 1K definition cameras. Each camera location includes one or more high definition video cameras and electronics for instrumenting those cameras. Each of the camera locations is in communication with production center 450. In one embodiment, the system of FIG. 4 is used to track a three dimensional location of each of the cars during an automobile race, in real time. The system also tracks the movement of each of the cameras used to broadcast the race. Based on the information about the attitude of the cameras and the three dimensional locations of the cars, the system can highlight a live video of the race to produce a number of effects desired by the production team.

Base station 422 includes GPS reference station 420 with GPS antenna 432. This reference station is surveyed with accuracy to determine its location. Reference station 420 receives GPS information from GPS satellites and determines differential GPS error correction information. This error correction information is communicated from the GPS reference station (via base station 422) to production center 450 for eventual retransmission to each of the base stations. The base station will send the information to each of the DAPS units 412. In another embodiment, the system of FIG. 4 can use pseudolites to provide additional data to the GPS receivers in the DAPS units.

The configuration of FIG. 4 is merely a brief example for which further details may be obtained from U.S. Pat. No. 6,744,403 ("GPS based tracking system"), the entirety of which is incorporated here by reference. However, at the same time, the automated determining of the 3D location of an object of potential interest is not limited to the GPS based embodiment of U.S. Pat. No. 6,744,403 and the automated determining of the potential interest state of the object is not limited to the 900 MHz telemetry embodiment of U.S. Pat. No. 6,744,403. It is within the contemplation of the present disclosure to automatically and alternatively or additionally determine locations of objects of potential interest by various other automated methods including, but not limited to, use of sound detection, use of magnetic object detection, use of near field electromagnetic detection, use of optical detection (including in the IR band), use of image outline detection and so on. More specifically, race cars tend to make high volume noises whose proximity can be detected with noise detectors mounted in spaced apart distribution along the roadway. Position between spaced apart ones of the noise detectors can be determined by interpolation. Each race car may be outfitted with an on-vehicle near field wireless transceiver that outputs the car's identity and current state parameters to a nearby along-roadway near-field wireless transceiver. The wirelessly relayed state parameters may include, but are not limited to, current speed, engine RPM, engine temperature oil pressure, fuel remaining, tire conditions, driver biometrics (e.g., heart rate, breathing rate, blood pressure, etc.) and so forth. The near-field wireless transceivers may operate in multiple bands such that noisy channels can be automatically bypassed. Alternatively or additionally, each car may be outfitted with IR LED's (beacons) mounted to its roof that output pulsed light codes indicating the vehicle's identification and/or current state parameters to overhanging receivers mounted on tall poles, on a drone or a balloon flying over the race course. The ground location from which the vehicle's identification is received by the overhanging receiver(s) indicates its location. Changes in location indicate speed and direction. These data items are wirelessly relayed to an automated machine system (e.g., data processing unit(s), memory and interface units) which then automatically determines the whether the object is of potential interest, and if so where it is located (if at all) within the viewable scene (e.g., FIG. 3) of each high definition video camera.

One automated method of determining whether an object whose 3D location is known relative to a "world" frame of reference (e.g., 405) involves use of matrix transforms.

So-called, registrations spots within the real world venue (e.g., race course) are marked with registration fiducials prior to the even and the in-camera locations of those fiducials relative to the camera's scenery frame of reference (Sx, Sy) are recorded. Each time a camera is aimed to include those registrations spots, a conversion can be carried out from the pixel coordinates of the 2D image to the 3D coordinates of the world coordinate system 405 and then back to other points within the camera's 2D image plane. Further information can be found in E. Trucco and A. Verri, "Introductory techniques for 3-D computer vision," chapter 6, Prentice Hall, 1998, U.S. Pat. No. 5,912,700, issued Jun. 15, 1999, and U.S. Pat. No. 6,133,946, issued Oct. 17, 2000, each of which is incorporated herein by reference.

In one approach, the world coordinate system 405 includes orthogonal directions represented by an Xw axis, a Yw axis, and a Zw axis. An origin of the world coordinate system may be chosen to be, for example a bottom footing of an identified light pole in front of the race course grand stand, but other locations may be used instead. The start of a "world" time clock Tw may be made to coincide with a race timing clock kept by race officials.

Each camera can be provided with sensors which detect intrinsic and extrinsic parameters of the camera where these parameters can be variable. Intrinsic parameters, such as focal length, lens distortion and zoom setting represent characteristics of the camera design and settings, and do not depend on the position and orientation of the camera in space. Extrinsic parameters, such as tilt or pan, depend on the position and orientation of the camera in space. Such sensors can be provided using techniques known to those skilled in the art. For example, pan and tilt sensors can be attached to a tripod on which the camera is mounted. See, e.g., U.S. Pat. No. 5,912,700, issued Jun. 15, 1999, incorporated herein by reference. The sensors can be used to determine the field of view of the camera, e.g., where the camera is pointing and what it can see.

It is also possible to determine camera extrinsic and intrinsic parameters without sensors, e.g., as described in Tsai's method. See, e.g., Tsai, Roger Y. (1986) "An Efficient and Accurate Camera Calibration Technique for 3D Machine Vision," Proc. of IEEE Conf. on Computer Vision and Pattern Recognition, Miami Beach, Fla., 1986, pp. 364-374. For example, one approach to determine the intrinsic and extrinsic parameters of a camera involves placing reference marks in various measured or known locations in the event facility such that each mark looks different and at least one mark will always be visible to the camera while the camera is pointed at a desired portion of the event facility. More specifically, these reference marks may be positioned at convenient spots along the guard rail of the race course. A computer using optical recognition technology can find the pre-specified marks or spots in video frames and then, based on the mark's size and position in the video frame, determine the camera parameters. Another approach to determining intrinsic and extrinsic parameters of a camera involves placing reference marks in various measured or known locations in the event facility such that each mark looks different, but the marks may be removed after camera parameters have been determined. A computer implementing a camera parameter estimation algorithm based on manual user interaction rather than, or in addition to, image recognition can determine camera parameters.

Various approaches may be taken with respect to managing the volume of data produced by the respective n*J-by-m*K pixels cameras. In one embodiment, all footage captured by the n*J-by-m*K pixels cameras are stored for later processing. In an alternate embodiment, some or all of the captured footage is processed in real time or with some delay while looking to automatically discard parts of the footage that lack "worthiness" of keeping it such as lack of "interestingness". In a same or alternate embodiment, some or all of the captured footage is processed in real time, near real time, or with some delay while looking to automatically tag portions of the footage with appropriate meta-data that can be used then or later to automatically determine which parts of the footage have sufficient "worthiness" or "interestingness" so that full video thereof is to be kept; which do not have such "worthiness" or "interestingness", and if not, to determine if still snapshots or other such reduced size imagery extracted from the full video is to be instead kept and/or if merely informational data about the imagery is to be kept, or nothing is to be kept.

Figure 5:
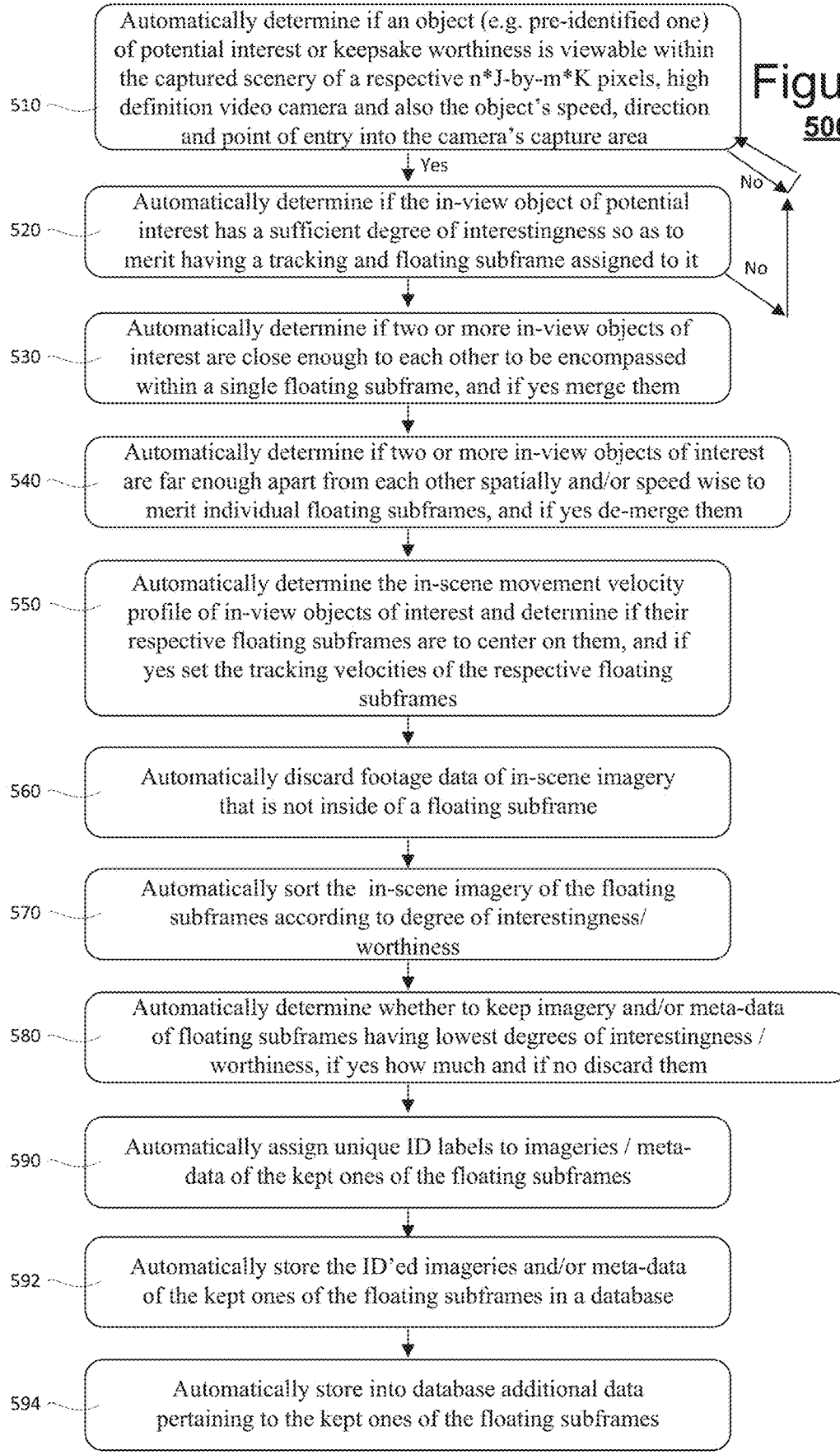
FIG. 5 depicts a flow chart of a process for using a plurality of high definition video cameras and creating for their captured high definition image planes, one or more floating subframes that respectively spot and track corresponding objects of potential interest.

Referring to FIG. 5, in one embodiment, one or more data processing units (e.g., microprocessors) are used in conjunction with associated memory units and associated hardware interface units to carry out a machine-implemented and automated process 500. The process 500 includes a step 510 in which it is automatically determined if an in-venue object of potential interest and/or keepsake worthiness (e.g., a race car on roadway 110) is viewable within the captured scenery (e.g., the 16K scenery of FIG. 3) of a respective n*J-by-m*K pixels, high definition video camera. If the determination indicates no such in-scene object of potential interest or worthiness, the footage is meta-data wise tagged as having no in-scene object of potential interest and step 510 is repeated. In addition to automatically determining current presence of an object of potential interest/worthiness within the imagery capture range (see 261-264 of FIG. 2) of a respective n*J-by-m*K pixels camera, the process may automatically determine the object's current speed and direction and may automatically predict when and at what location the object of potential interest will enter the imagery capture range (see 261-264 of FIG. 2) of a respective n*J-by-m*K pixels camera. This optional, additional information may also be included in the tagged on meta-data.

In one embodiment, "interestingness" and/or "keepsake worthiness" (and the extent thereof) is automatically determined with use of appropriate data processing (e.g., one or more telemetry intaking and data processing units) by taking advantage of comparative telemetry obtained for the various tracked objects (e.g., race cars). For example, GPS-based and/or other target identifying and tracking data may indicate that one tracked object (e.g., first race car) has overtaken a second tracked object (e.g., second race car or last place car) along a predefined route (e.g., the race course) and that event may thus be automatically meta-data tagged as footage that includes a bypassing of one tracked object by another and optionally automatically meta-data tagged to indicate the identity and/or type of the passing object (e.g., second place race car) and the identity and/or type of the passed object (e.g., first place race car or last place car of the pack). The utilized telemetry may include not only position along a predefined route (e.g., the race course) but also various speed, acceleration and force indicators for use in automated detecting of, for example, crashes, hard swerves (e.g., to avoid a crash), spins, rollovers, loss of control, hard braking, rapid accelerations or attempts to achieve such based on accelerator pedal actuation, and so on. Additional meta-data tagging of the associated footage may indicate: when each identified car (or other tracked object) crosses the start/finish line; when each car takes a pit-stop; when it enters the pit road, exits the pit road (in other words, comes back onto the race course), accelerates and/or decelerates beyond a predetermined threshold, achieves a speed or velocity over a predetermined threshold, achieves a height over a predetermined threshold (e.g., in the case of a motocross race over a bumpy track) and sets an event history record (e.g., fastest lap time so far). The utilized telemetry may also provide for automated meta-data tagging of the associated footage to indicate: how many identified objects are in the associated footage, where each tracked object (e.g., race car) is located when a predetermined in-event occurrence takes place (e.g., event context is changed by raising of a caution flag; event context is changed when the lead car crosses the finish line). These are merely examples and events or event context changes of respective degrees of interestingness and/or keepsake worthiness may vary depending on the nature of the event being captured. Examples of various other kinds of events may include, but are not limited to, motorcycle races, bicycle races, airplane shows, boat races, skateboarding contests, skiing events, foot races and/or other track and field sports events as well as many in-arena events (e.g., ice hockey, basketball, etc.). Although automated meta-data tagging of the captured footage is primarily described here, it is within the contemplation of the present disclosure for the automated meta-data tagging to be supplemented by and/or substituted for by manual meta-data tagging when a human operator later reviews the captured footage. The end result may therefore include captured footage that is both automatically meta-data tagged and manually meta-data tagged as appropriate for different kinds of events.

An important aspect of the n*J-by-m*K pixels cameras is that they can be kept rolling at all times during a predetermined event duration (even if the contextual game state is that of being in a commercial break) and the associated data processing units can also be kept always on and automatically sorting through the captured and temporarily buffered imagery and meta-data. By contrast, human camera operators typically have to take breaks for example due to callings of nature or simple inability to stay focused on one area of concentration for prolonged periods of time. Therefore, for example, the continuously filming n*J-by-m*K pixels cameras can capture imagery of keepsake worthy persons and/or other objects even when they are doing basically nothing during a commercial break or the like, but the imagery (and/or associated meta-data) is deemed worthy of keeping to one extent or another simply because of a celebrity nature or other such keepsake worthiness attribute of the automatically identified person/object. By extent of keepsake worthiness, it is meant here that sometimes an expert knowledge database may determine that it is not worthwhile to keep all of the video footage of, for example, a famous hockey player as he sits in the penalty box for the entirety of the penalty time, but nonetheless it is worthwhile to keep a short, loopable clip picked out of that footage and/or one or more still shots and/or meta-data automatically generated from that otherwise discardable footage. An exemplary keepsake worthiness determining rule within the expert knowledge database may read as follows: IF Footage includes identified person having celebrity status>Level3 AND Context is During_Ad_Break AND IF identified person's average movement amount<AvgMoveAmt5 THEN Isolate loopable clip within Footage and tag rest for discard and save meta-data of identified person's average movement amount ELSE IF identified person's average movement amount<AvgMoveAmt5 THEN Isolate best still frame of person and tag rest for discard and save meta-data of identified person's average movement amount and duration of that low level of movement. This of course, is merely an example; but it provides a notion of how keepsake worthiness and extent thereof may be automatically determined.

Referring still to FIG. 5, if the determination step 510 indicates that there is an in-scene object of potential interest/ keepsake worthiness (yes), then in a further (but not necessarily subsequent) step 520 it is automatically determined if the identified in-venue object has associated with it a sufficient degree of "interestingness" and/or keepsake worthiness so as to merit having a tracking and/or floating subframe (e.g., 310c) assigned to it. Interestingness, keepsake worthiness, and degree/extent thereof may vary from application to application. In the exemplary case of a high speed car race, an alone by itself race car (e.g., that inside box 310h of FIG. 3) that is merely traveling at the current average speed of all cars, has no design attributes of special keepsake worthiness or vehicle driver of special renown and is neither among the front 5 cars or among the backmost 5 cars might be determined to have a zero degree of "interestingness" or a relatively low value of interestingness or keepsake worthiness (e.g., a 5 on a scale of 0-100). On the other hand, two close together cars (e.g., those inside box 310f of FIG. 3) that are traveling at above average speed and are among the leading 5 cars of the race (and additionally where one of the cars has unique design attributes that are predetermined to be of special keepsake worthiness and/or where at least one vehicle driver is of special renown) may automatically be assigned a relatively high value of interestingness/keepsake worthiness (say 90 on a normalized scale of 0 to 100) by a footage assessing expert knowledge database that is used for automatically assessing the temporarily buffered footage for keepsake worthiness and extent thereof. More broadly speaking, degree of interestingness/keepsake worthiness may be automatically determined based on how one or more social status attributes and/or physical state parameters (e.g., speed, closeness, fuel remaining, engine temperature) of a first group of one or more objects of potential interest (e.g., a first cluster of race cars) compare to that of another group of one or more other objects of potential interest present within event space or how current statistical aspects of the first group (e.g., average lap speed) compare to previous statistical aspects of the same first group and/or to corresponding current or previous statistical aspects of the second group.

The tracking and floating subframes in one embodiment provide for efficient keep/discard operations based on metadata. In this embodiment, metadata associated with a subframe indicates an interestingness score or score for one or more vehicles or other objects within the subframe. Although the term "interestingness score" is used throughout the specification, an interestingness score includes a score or any other quantified data for determining the importance, relevancy, interestingness, noteworthiness, etc. of events and/or objects captured using one or more video cameras and/or through telemetry. The term "event score" is equivalent to "interestingness score" and is used throughout the application. Based on a comparison of an interestingness score of the subframe metadata to a second interestingness score of second subframe metadata, the system is operable to discard imagery data associated with a subframe with a lower interestingness score.

Additionally, a tracking and floating subframe in one embodiment does not include any imagery data directly but instead is a unique file type that stores metadata and indicates coordinates corresponding to video imagery data. For example, one exemplary tracking and floating subframe indicates video imagery data from Camera 1, an interestingness score of 50, bounding subframe coordinates of x=0:1920, y=0:1080, and a vehicle ID of Number 24. Thus, the system is operable to retrieve the tracking and floating subframe and then store and discard imagery based on metadata included in the tracking and floating subframe.

The meta-data of the present invention includes tags relating to object states, object identities, telemetry data obtained from the objects, etc. These tags are stored in the database with the rest of the meta-data and the captured image data, which includes video clips, audio clips, and/or still images. Advantageously, the tags of the database are searchable such that an operator can use the database to quickly determine relevant video to show for replays, highlight reels, etc. In one embodiment, one or more data processors or data processing units associated with the database automatically determine and suggest one or more replay clips or highlight reels based on interestingness scores, object identities, object states, etc. Examples of tags include "crash", "Dale Earnhardt, Jr.", "Jimmie Johnson", "leader", "final minute", "fastest lap time", "acceleration beyond given threshold", "spin", "pit entry", "pit exit", "finish line cross", "passing", "passing for lead", etc. Notably, the tags of the database are searchable in real-time or near real-time and the processor is operable to suggest replay clips or highlight reels in real-time or near real-time. Tags also include a lap tag, a car number, an owner of the clip, an event name, and event location, and a session. Preferably, a Graphical User Interface (GUI) which includes a window with a list of tags and associated clips is automatically populated in real-time or near real-time by the one or more processors or processing units upon creation of the clips and meta-data including the tags.

In one embodiment, an automated expert knowledge base system is used to automatically determine degree of "interestingness" and/or keepsake worthiness and extent thereof. The expert knowledge base system operates as a virtual cameraman who has acquired know how and/or expertise in the field of application (e.g., high speed car racing) so as to know at least subconsciously what factors add to "interestingness"/keepsake worthiness and which detract from them. For example, the human-emulating, expert knowledge base system may contain IF-THEN knowledge rules corresponding to how it is believed that emulated human makes decisions. More specifically one such rule may provide: IF object of potential interest is a race car AND IF current speed is greater than average course speed by 5% or more THEN add 20 to its interestingness value AND IF it is among leading 5 cards in the race THEN add an additional 5 to its interestingness value OR IF among last 5 cards in the race THEN add only an additional 2 to its interestingness value ELSE . . . (more of the expressed and stored and machine-executable rule can follow here). The knowledge rules need not be fixed ones and may change for example over the duration of the race (e.g., first 50 laps of the Daytona 500 versus middle 400 versus last 50). In one embodiment, a threshold value is set for sufficient degree of "interestingness" and/or keepsake worthiness and if the determined value is below threshold (no, it does not have sufficient degree) control within process is returned to step 510 and no floating subframe is assigned.

In one embodiment, the rules are weighted to specific events of vehicles on a racetrack. For example, a passing operation adds five points to a vehicle's interestingness score, while a collision adds 30 points to the vehicle's interestingness score. Accordingly, certain events subtract from an interestingness score. For example, as a vehicle falls in position from first place to last place, the vehicle's score decreases according to a pre-defined rule amount (for example, by 500 points). In one embodiment, the interestingness score decreases on a scaled amount from first to last place such that a vehicle falling from second to third place does not have as significant a drop in interestingness score as a vehicle who falls from fifth to sixth place. Notably, when this score is combined with tracking and floating subframes and excess imagery discarding operations, the system provides systems and methods for using rules rather than artists to determine which imagery to capture and keep. Whereas in prior art camera operators often had to manually determine and choose which imagery data to capture and record, the present invention provides systems and methods for capturing imagery data that fits specific rules, weights, and scores, so as to transform the subjective processes of camera operators and video artisans into a novel system for capturing vehicle imagery data.

Alternatively, a telemetry data hierarchy is used in combination to determine which imagery data to capture and record. The imagery data hierarchy includes a hierarchy telemetry data such as the automated detecting of, for example, crashes, hard swerves (e.g., to avoid a crash), spins, rollovers, loss of control, hard braking, rapid accelerations or attempts to achieve such based on accelerator pedal actuation, etc. In one embodiment, the hierarchy is as follows: (1) rollovers, (2) crashes, (3) spins, (4) hard swerves, (5) rapid acceleration, (6) hard breaking, (7) attempts to achieve rapid acceleration. In this example, imagery data is captured for telemetry data which indicates a (1) rollover if there is competing telemetry data for (5) rapid acceleration. If there are one or more ties between the telemetry data (e.g. 3 telemetry sensors detect (6) hard breaking), then an object identity and/or object state hierarchy breaks the tie in favor of the higher ranked object identity and/or object state. In one embodiment, the object identity hierarchy is ordered based on driver ranking coming into the race, celebrity status of the driver, the finish order of the drivers in the last race at the course, and/or combinations thereof. In another embodiment, ties between the competing telemetry data are broken based on a recency of the telemetry data (e.g., the imagery data associated with the more recently collected telemetry data is captured and recorded instead of the imagery data associated with older collected telemetry data). Notably, the timing of the telemetry data is determined using any measurement of time and is preferably determined in seconds or fractions of seconds (e.g. milliseconds, microseconds, nanoseconds, etc.).

If two or more objects of sufficient potential interest are close to one another, then a single floating subframe (e.g., 310f) may be assigned to the group. This determination is automatically carried out in step 530. As in the case of determining sufficient degree of interestingness/keepsake worthiness (step 520) an automated expert knowledge base system may be used to automatically determine if plural objects of interest are to be merged within a single floating subframe. Alternatively, if one of the close-by objects/persons is of relatively low (e.g., almost zero) keepsake worthiness while the other has substantial keepsake worthiness, it may be enough to generate and store in a database, meta-data indicating the frame in which the unworthy object/person was in the same scene as the worthy one while not saving footage of the unworthy one. Then later, if it is determined that footage of the unworthy one is desired, the saved meta-data may be used to find the kept footage of the worthy object/person and to use that part, for example, to report that here is a scene where racecar number Xu (number of unworthy one) is being passed by lead car Xw (number of worthy one). Thus the amount footage stored more permanently in the database is reduced and yet loopable small video clips or stills of relatively unworthy performers may still be found and reported on. Sometimes it becomes necessary to assign a separate single floating subframe to one race car even if it is initially part of a clustered pack of cars. For example, it starts separating spatially and/or speed wise from the rest of the pack or it is driven by a driver who is known to have a tendency to break out of the pack under determinable conditions. This is automatically carried out in step 540. Again, an expert knowledge base system may be used in this step to automatically determine when the general rule for assigning a single floating subframe to a pack of close-in-proximity racecars should be violated for one or more of them.

In step 550 it is automatically determined what the in-scene movement velocities are of the respective in-view objects of interest/keepsake worthiness and it is automatically determined if their respective floating subframes are to center on them, and if yes, the step automatically sets the tracking velocities of the respective floating subframes. An expert knowledge base system may be used in this step.

In step 560, all footage data of in-scene imagery that is not inside of a floating subframe is automatically discarded. (As indicated above, in an alternate embodiment, all captured footage is kept and the determination of what to keep and what to discard—if at all—is made at another time and/or another location.) In the case where there is automated and on-site discard, storage capacity is not wasted on captured scenery portions of the respective n*J-by-m*K pixels, high definition video cameras that do not contain imagery of sufficient interestingness/keepsake worthiness.

In some embodiments, long-term storage capacity may be limited such that it becomes desirable to prioritize competing ones of temporarily buffered footages and to store only a subset of the floating subframe footages having a top N degrees of interestingness/keepsake worthiness (where here N is an integer such as 3, 5 or 10). Interestingness and/or keepsake worthiness can change over time and an object that has a low degree of interestingness/keepsake worthiness when entering one or more camera viewing ranges may nonetheless become highly interesting before it leaves the viewing range(s). Accordingly, in step 570 an automated sorting of the in-scene imagery of the floating subframes is carried out according to an over-time determined, final degree of interestingness/keepsake worthiness. In step 580 it is automatically determined whether to keep imagery of floating subframes (and/or meta-data generated from them) having the lowest degrees of interestingness/keepsake worthiness and if so, to what extent. If not, they are automatically discarded. Again, an expert knowledge base system may be used in these steps.

In step 590, the system automatically assigns unique ID labels to imageries and/or generated meta-data of the not-discarded ones of the floating subframes, for example ID labels that categorize the kept footages and/or still photos and/or generated meta-data according to race number, lap number, time within lap and race car ID number, driver ID number and so forth. In step 592, the system automatically stores the identified (ID'ed) imageries of the kept subframes and/or meta-data in a database (e.g., 670 of FIG. 6). In step 594, the system may automatically store yet additional data pertaining to the kept ones of the subframes such as respective state parameters of the imaged objects (e.g., quality of the captured footage, included objects/persons of low keepsake worthiness, average speed, maximum speed, closeness to nearby other objects of interest, driver biometrics and so on). In this way the database can be later queried according to the additional data and the corresponding video footages, loopable short clips, still photos and/or dynamically generated meta-data of the stored subframes can be retrieved for subsequent analysis purposes.

Figure 6:
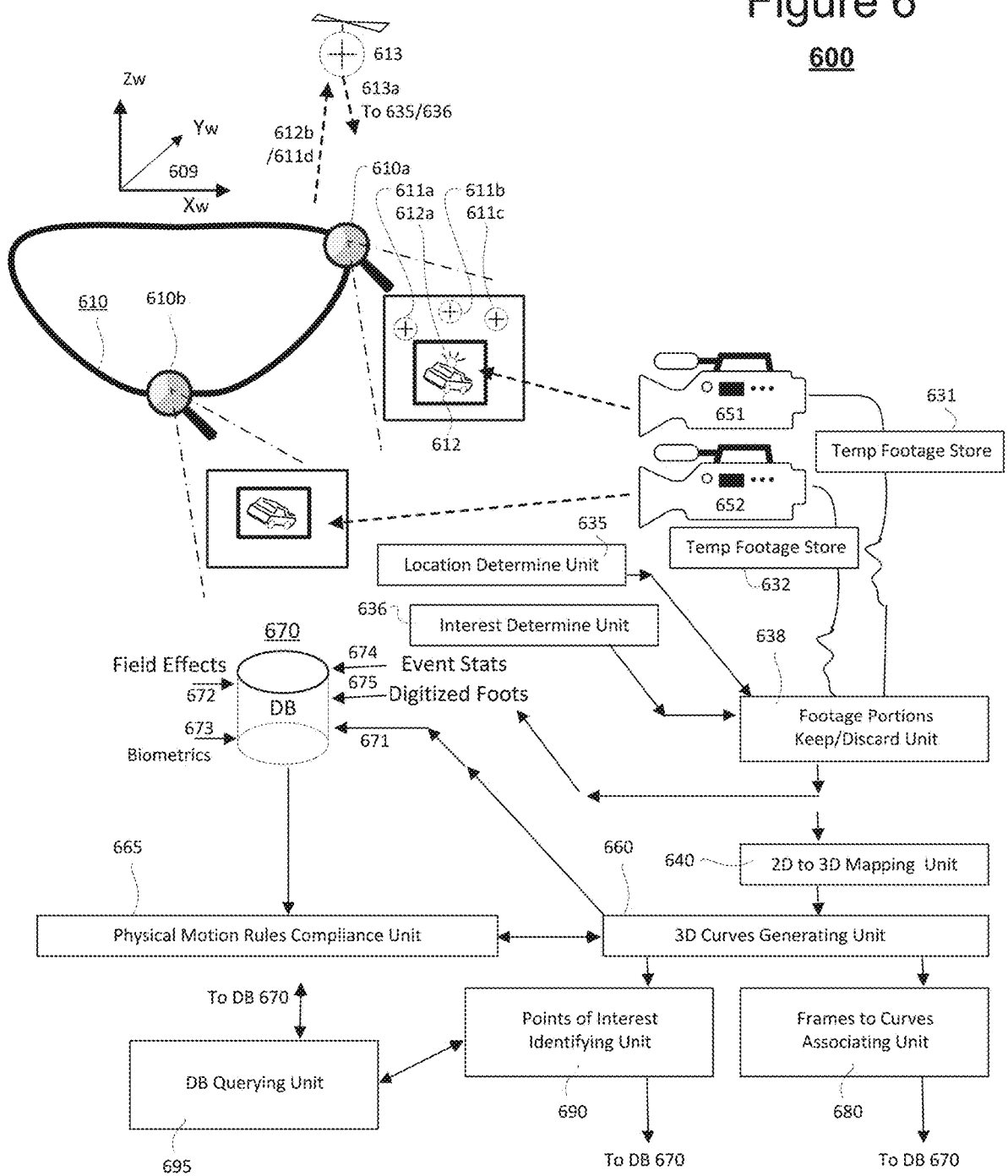
FIG. 6 depicts a hardware configuration that may be used for calibrating the high definition video cameras.

Referring to FIG. 6, a system 600 that can carry out the method of FIG. 5 is shown. Unmanned, n*J-by-m*K pixels, high definition video cameras such as 651 and 652 are set up prior to the race to capture respective 2D images of their respectively assigned raceway scenes (e.g., 610a, 610b). The cameras communicate pre-race and during-race images in the form of analog or digital signals to a processing facility (e.g., 450) which can be a mobile facility such as a van or trailer (see briefly 165 of FIG. 1) parked outside the event facility 100, in one possible approach. The pre-race images can be used for calibration as will be explained later below. The processing facility may include equipment such as temporary analog or digital image storage units 631, 632 (respectively for high definition video cameras 651, 652) which receive and temporarily store (buffer the) full lengths of the latest captured video imagery. However, the full lengths of captured imagery (especially that of uneventful roadway stretches during the race like 310b of FIG. 3) are generally not kept. Instead an object locating (and optionally also object identifying) unit 635 is used to automatically determine whether each object of potential interest or of other basis of keepsake worthiness (e.g., race car 612) is positioned so as to be within the assigned scene (e.g., 610a) of each respective camera. At the same time, a degree of interestingness/keepsake worthiness determining unit 636 is used to automatically determine whether each object of potential interest (e.g., race car 612) has current identity and/or state parameters that indicate it is worthwhile keeping all the video footage of that in-scene object or less than all or none of it.

More specifically, the object of potential interest (e.g., race car 612) may have one or more electromagnetic emitters (612a) mounted on its roof that emit coded light beams and/or coded microwave beams for detection by an above-the-scene location detector such as a flying drone platform 613. Wireless uplink 612b/611d represents a wireless linking of information signals respectively from the roof mount beacon 612a and the roadside beacons 611a-611c. The above-scene platform 613 wirelessly relays (e.g., by path 613a) information collected from the scene area 610a to the object locating/identifying unit 635 and to the degree of keepsake worthiness determining unit 636. For example, roof mounted beacon 612a may emit coded electromagnetic beams (e.g., IR laser beams, microwave beams) that identify its respective object 612 and relay current state information about the object and/or its inhabitants. Various sensors may be embedded in the vehicle 612 or operatively coupled to the driver for sensing respective state parameters. Alternatively or in addition to the rooftop beacon 612a, an adjacent roadway guardrail or the like may have mounted there along, a plurality of spaced apart detectors and beacons, 611a, 611b, 611c that detect the nearby presence of the object of potential interest (e.g., 612) and capture near field radio signals from that object that provide current state information about the object and/or its inhabitants. That data is wirelessly relayed to the above scene platform 613 and/or directly to the location and interestingness determining units 635-636. The location and interestingness/keepsake worthiness determining units 635-636 relay their respective determinations to one or more footage portion keep/discard units 638 (only one shown, but could be one per camera). One or more data processors and associated memories are provided for implementing the footage portion keep/discard unit(s) 638 and the location and interestingness determining units 635-636 where the associated one or more memories include software instructions configured to cause the corresponding one or more data processors to carry out the footage portion keep/discard actions (and/or meta-data keep/discard actions) detailed herein and the location determining and interestingness determining actions detailed herein. The footage portion keep/discard unit(s) 638 automatically determine which parts of the temporarily stored initial footages (in buffers 631, 632) should be discarded and which should be kept (at least for a little while longer) based on degree of potential interest or other basis of keepsake worthiness. They also determine the run lengths of the kept footage portions and start/end points; for example for the sake of providing a loopable short clip rather than the whole of the video footage. Respective object ID, time stamp and location indicators may be logically linked to the kept footage portions (and/or kept meta-data portions) so that temporal and spatial relations between them may be preserved. In one embodiment, each kept footage portion of each camera is assigned a Race number (and optionally a Year number), a within-race lap number, and a respective camera number. In one embodiment, the kept data is instead initially identified by a unique ID number and a type of object indicator (e.g., race car, ambulance, pace car?) where the unique ID number may for example be a hash of the event date, footage time and venue identification. A substantially same ID number may be provided for kept footages of each 15 minute interval so that simultaneous performances of different cars can be correlated to one another based on the ID number, although such numbering is not necessary. Once the event date, time and venue ID are extracted, these can be mapped to specific races and lap numbers.

Once the kept image portions are determined, the signal processing facility can then enhance the kept video signals; e.g., by digitizing them if not already done, improving contrast so that pre-specified image parts of the tracked objects can be better identified by automated recognition means and so that event representing mathematical models can be produced if desired based on the determined positions, paths and/or other states of the specifically tracked objects. Statistical information 674 regarding each tracked object can be also be produced for storage in a database (DB 670). This allows for later data mining (e.g., via unit 695) based on for example, average and/or peak and/or minimum speeds, average directions and/or angles, distance traveled by each tracked object, height of each tracked object, and so forth. The local processing facility (e.g., 165) can subsequently transmit the captured, kept and enhanced images and information for further storage and further processing at another location such as a television broadcast facility or a sports data processing center.

In terms of detail, for each 4K or greater high definition video camera, 651, 652, etc., respective location determining transformation matrices may be developed for converting from the 2D coordinates of the respective, 4K or greater image capture plane of the camera to the 3D coordinates of the "world" reference frame 609 and vice versa. A transformation matrix M, may be defined based on a localized venue spots registration process (e.g., spaced apart roadside beacons 611a, 611b, 611c may be such localized venue registration spots) and in accordance with the following equation EQU.01:

$$M = \begin{pmatrix} m00 & m01 & m02 & m03 \\ m10 & m11 & m12 & m13 \\ m20 & m21 & m22 & 1 \end{pmatrix} \quad \text{(Equ. 01)}$$

M relates the respective camera image coordinate system to the world coordinate system. Equations of motion may be used to express the three-dimensional location of each tracked object as a function of time. The equations of motion should be sufficiently accurate over the course of the measured trajectory. Approximate equations of motion and piecewise equations of motion that apply to portions of the trajectory are acceptable to provide the estimated position of the object for any given relevant time is within required measurement accuracy. Further, the equations used should be suitable for the type of object tracked and the desired degree of tracking accuracy. For example, the equations of motion for a race car 612 or other object under the constant of gravitational and/or other acceleration in the three-dimensional world coordinate system may be as follows:

$$X_w(t) = x0 + v_x0*t + (1/2)a_x*t^2 \quad \text{(Equ. 02)}$$

$$Y_w(t) = y0 + v_y0*t + (1/2)a_y*t^2 \quad \text{(Equ. 03)}$$

$$Z_w(t) = z0 + v_z0*t + (1/2)a_z*t^2 \quad \text{(Equ. 04)}$$

The nine parameters x0, y0, z0, vx0, vy0, vz0, ax, ay and az, are coefficients of the equations of motion for respective vector directions. Coefficients x0, y0, z0 denote the initial position, coefficients vx0, vy0, vz0 denote the initial velocity of the object in the three orthogonal directions at time t=0, and coefficients ax, ay, az denote the vector components of acceleration operating on the object in the three orthogonal directions at time t. The acceleration can indicate, e.g., how much force is on the race car 612, denoting for example how strongly it hugs the road during banking maneuvers. The xyz acceleration components can be converted to corresponding xyz force components (F=ma) once the involved masses are determined. The mass and acceleration data may be used to deduce how much force is exerted by or on each object. For convenience, g denotes gravitational acceleration at −9.8 msec$^2$. While the above equations of motion are linear, one or more non-linear equations can be used as well. For example, a velocity squared term may be used when it is desired to account for atmospheric drag on an object in flight.

For each respective image capture plane (e.g., 4K high definition frame), an initial approximation of a location of a tracked object (e.g., 612) in the image may be identified by the pixel coordinates (Sx, Sy), where Sx denotes a horizontal position in the image and Sy denotes a vertical position in the image. The object can be detected in the image in different ways. In one approach, the pixel or subpixel data of the image is processed to detect areas of contrast which correspond to the object and its shape (e.g., round). The expected size of the object in pixels can be used to avoid false detections. For example, a contrasting area in the image which is significantly smaller or larger than the expected size of the object can be ruled out as representing the object. Moreover, once the position of the object in a given image is identified, its position in subsequent images can be predicted based on the position in the previous image. Other various techniques for analyzing images to detect pre-specified objects which will be apparent to those skilled in the art may be used. For example, various pattern recognition techniques can be used. Radar, infra-red and other technologies can also be used as discussed in U.S. Pat. No. 5,912,700, issued Jun. 15, 1999, and U.S. Pat. No. 6,133,946, issued Oct. 17, 2000, both of which are incorporated herein by reference. In one embodiment, where initial camera settings do not provide sufficient contrast between one or more focused-upon players and their respective backgrounds, optical spectral filters and/or polarizing filters may be added to the cameras to improve contrast between player and background. More specifically, in one example race car body paintings may be specially coated with light polarizing fibers and/or infra-red (IR) absorbing paints that substantially distinguish the race cars from natural field materials so that corresponding camera equipment can capture well contrasted images of the objects of potential interest as distinct from background filed imagery.

Still referring to the conversion of camera plane data to world frame data or vice versa, one task is to calculate the screen coordinates, (s$_X$, s$_Y$), given the world coordinates (world space) of a point. In practice, the point in world space might correspond to a physical object like a race car (612) or a part of a geometrical concept, like a roadway guide line, but in general can be any arbitrary point or interrelated set of points. One example method is to break the overall mapping into three separate mappings. First a mapping is carried out from three dimensional (3D) points expressed in world coordinates (world space) to 3D points expressed in camera centered coordinates. This first mapping may be denoted as T$_{WTC}$. Second, a mapping is carried out from 3D points expressed in camera centered coordinates, to undistorted two dimensional (2D) screen coordinates (e.g., a position in the video). This mapping models the effects of cameras; i.e. producing 2D images from 3D world scenes. This second mapping may be denoted as K. Third, there is a mapping from undistorted screen coordinates to distorted screen coordinates (e.g., a position in the video). This mapping models various effects that occur in cameras using lenses; i.e. non-pinhole camera effects. This third mapping is denoted here as f.

When composited together, the three mappings create a mapping from world coordinates into screen coordinates:

When composited together, the three mappings create a mapping from world coordinates into screen coordinates (in the below equations, screen coordinates are given as Sx and Sy):

$$\begin{pmatrix} X_w \\ Y_w \\ Z_w \end{pmatrix} \underset{T_{WTC}}{\leftrightarrows} \begin{pmatrix} X_c \\ Y_c \\ Z_c \end{pmatrix} \underset{K}{\leftrightarrows} \begin{pmatrix} s_x \\ s_y \end{pmatrix} \underset{f}{\leftrightarrows} \begin{pmatrix} s'_x \\ s'_y \end{pmatrix} \quad (1)$$

Each of the three mapping noted above will now be described in more detail.

The mapping from 3D world coordinates to 3D camera centered coordinates (T$_{WTC}$) will be implemented using 4×4 homogeneous matrices and 4×1 homogeneous vectors. The simplest way to convert a 3D world point into a 3D homogeneous vector is to add a 1 into the 4th element of the 4×1 homogeneous vector:

$$\underbrace{\begin{pmatrix} X_w \\ Y_w \\ Z_w \end{pmatrix}}_{inhomogenous} \mapsto \underbrace{\begin{pmatrix} X_w \\ Y_w \\ Z_w \\ 1 \end{pmatrix}}_{homogenous} = X_W \quad (2)$$

The way to convert from a 3D homogeneous vector back to a 3D inhomogeneous vector is to divide the first 3 elements of the homogenous vector by the 4th element. Note that this implies there are infinitely many ways to represent the same inhomogeneous 3D point with a 3D homogeneous vector since multiplication of the homogeneous vector by a constant does not change the inhomogeneous 3D point due to the division required by the conversion. Formally we can write the correspondence between one inhomogeneous vector to infinitely many homogeneous vectors as:

$$\underbrace{\begin{pmatrix} X_w \\ Y_w \\ Z_w \end{pmatrix}}_{inhomogeneous} \mapsto k \underbrace{\begin{pmatrix} X_w \\ Y_w \\ Z_w \\ 1 \end{pmatrix}}_{homogeneous} \quad (3)$$

for any $k \neq 0$.

In general the mapping $T_{WTC}$ can be expressed with a 4×4 matrix:

$$T_{WTC} = \begin{bmatrix} t_{11} & t_{12} & t_{13} & t_{14} \\ t_{21} & t_{22} & t_{23} & t_{24} \\ t_{31} & t_{32} & t_{33} & t_{34} \\ t_{41} & t_{42} & t_{43} & t_{44} \end{bmatrix} \quad (4)$$

which can be expressed using row vectors as:

$$T_{WTC} = \begin{bmatrix} t^{1T} \\ t^{2T} \\ t^{3T} \\ t^{4T} \end{bmatrix} \quad (5)$$

Finally if we use homogeneous vectors for both the world point in world coordinates, $X_w$, and the same point expressed in camera centered coordinates, $X_c$ the mapping between the two is given by matrix multiplication using $T_{WTC}$:

$$X_c = T_{WTC} X_w \quad (6)$$

If we want the actual inhomogeneous coordinates of the point in the camera centered coordinate system we just divide by the 4th element of $X_c$. For example if we want the camera centered x-component of a world point we can write:

$$X_c = \frac{t^{1T} X_w}{t^{4T} X_w} \quad (7)$$

To build the matrix $T_{WTC}$, we start in the world coordinate system (word space)—which is a specific UTM zone—and apply appropriate transformations:

For example, to translate to a helicopter mounted camera location (derived from GPS Receiver data): $T(H_x, H_y, H_z)$ Account for the exemplary helicopter rotation relative to the world coordinate system, based on obtained inertial data:

$R_z(-Pan_{Heli})$
$R_x(-Tilt_{Heli})$
$R_y(Roll_{Heli})$

Account for outer axis (outer axis of camera system) orientation relative to the exemplary helicopter frame (adjustments for misalignment of the outer ring relative to the helicopter body):

$R_z(PanAdjust)$
$R_x(TiltAdjust)$
$R_y(RollAdjust)$

Account for outer axis transducer measurement from the camera system and offset of zero readings relative to outer axis:

$R_z(Pan_{Outer} + PanAdjust2)$ $R_x(Tilt_{Outer} + TiltAdjust2)$

Note that PanAdjust2 and TiltAdjust2 are adjustment values for imperfections in the outer axis orientation. If the output of the sensor should be 0 degrees, these parameters are used to recognize 0 degrees. $Pan_{Outer}$ and $Tilt_{Outer}$ are the sensor (e.g., transducer) readings output from the camera system for the outer axis.

Account for non-linearity of inner axis (of camera system) pan and tilt transducer measurements via a look-up table $Pan_{Inner\_linearized} = L(Pan_{Inner})$ $Tilt_{Inner\_linearized} = L'(Tilt_{Inner})$ Account for inner axis transducer measurements and offset of zero readings relative to inner ring:

$R_z(Pan_{Inner\_linearized} + PanAdjust3)$ $R_x(Tilt_{inner\_linearized} + TiltAdjust3)$ $R_y(Roll_{Inner} + RollAdjust3)$ Note that PanAdjust3, TiltAdjust3 and RollAdjust3 are adjustment values for imperfections in the inner axis orientation. If the output, of the sensor should be 0 degrees, these parameters are used to recognize 0 degrees. $Pan_{Inner}$, $Tilt_{Inner}$ and $Roll_{Inner}$ are the sensor (e.g., transducer) readings output from the camera system for the inner axis.

Finally, convert to standard coordinate convention for camera centered coordinate systems with x-axis pointing to the right of the image, y-axis pointing up in the image, and z-axis pointing behind the camera $$R_x\left(\frac{\pi}{2}\right)$$

Thus the final rigid-body transform, $T_{WTC}$ which converts points expressed in world coordinates to points expressed in the camera centered coordinate system and suitable for multiplication by a projection transform is given by:

$$\begin{aligned} T_{WTC} = & R_x\left(\frac{\pi}{2}\right) R_y(Roll_{Inner} + RollAdjust3) \bullet \\ & R_x(Tilt_{Inner\_linearized} + TiltAdjust3) \bullet \\ & R_z(Pan_{Inner\_linearized} + PanAdjust3) \bullet \\ & R_x(Tilt_{Outer} + TiltAdjust2) \; R_z(Pan_{Outer} + PanAdjust2) \bullet \\ & R_y(RollAdjust) \; R_x(TiltAdjust) \; R_z(PanAdjust) \bullet \\ & R_y(Roll_{Heli}) \; R_x(-Tilt_{Heli}) \; R_z(-Pan_{Heli}) \; T(H_x, H_y, H_z) \end{aligned} \quad (8)$$

The form of the three rotation matrices: $R_x$, $R_y$, $R_z$ suitable for use with 4×1 homogeneous vectors are given below. Here the rotation angle specifies the rotation between the two coordinate systems basis vectors.

$$R_x(\alpha) = \begin{bmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{bmatrix} \quad (9)$$

$$R_y(\alpha) = \begin{bmatrix} \cos\alpha & 0 & -\sin\alpha & 0 \\ 0 & 1 & 0 & 0 \\ \sin\alpha & 0 & \cos\alpha & 0 \\ 0 & 0 & 0 & 1 \end{bmatrix} \quad (10)$$

$$R_z(\alpha) = \begin{bmatrix} \cos\alpha & \sin\alpha & 0 & 0 \\ -\sin\alpha & \cos\alpha & 0 & 0 \\ 0 & 0 & 1 & 0 \\ 0 & 0 & 0 & 1 \end{bmatrix} \quad (11)$$

The matrix representation of the translation transform that operates on 4×1 homogeneous vectors is given by:

$$T(d_x, d_y, d_z) = \begin{bmatrix} 1 & 0 & 0 & d_x \\ 0 & 1 & 0 & d_y \\ 0 & 0 & 1 & d_z \\ 0 & 0 & 0 & 1 \end{bmatrix} \quad (12)$$

The mapping of camera centered coordinates to undistorted screen coordinates (K) can also be expressed as a 4×4 matrix which operates on homogenous vectors in the camera centered coordinate system. In this form the mapping from homogeneous camera centered points, $X_c$, to homogeneous screen points, $S_u$ is expressed:

$$S_u = KX_c \quad (13)$$

$$w \begin{pmatrix} s_x \\ s_y \\ s_z \\ 1 \end{pmatrix} = KX_c \quad (14)$$

To get the actual undistorted screen coordinates from the 4×1 homogenous screen vector we divide the first three elements of $S_u$ by the 4th element.

Note further that we can express the mapping from homogeneous world points to homogeneous undistorted screen points via matrix multiplication.

$$S_u = KT_{WTC}X_w$$
$$= PX_w$$

where, $$P = KT_{WTC} \quad (15)$$

One embodiment uses a pinhole camera model for the projection transform K. If it is chosen to orient the camera centered coordinate system so that the x-axis is parallel to the $s_x$ screen coordinate axis, and the camera y-axis is parallel to the $s_y$ screen coordinate axis—which itself goes from the bottom of an image to the top of an image—then K can be expressed as:

$$K = \begin{bmatrix} -\dfrac{f'}{par} & 0 & u_o & 0 \\ 0 & -f' & v_o & 0 \\ 0 & 0 & A & B \\ 0 & 0 & 1 & 0 \end{bmatrix} \quad (16)$$

where, $$f' = \frac{N_y/2}{\tan(\varphi/2)} \quad (17)$$

$N_y$ = number of pixels in vertical screen direction.
$\varphi$ = vertical field of view
$par$ = pixel aspect ratio
$u_o, v_o$ = optical center
$A, B$ = Clipping plane parameters The clipping plane parameters, A, B, do not affect the projected screen location, $S_x$, $S_y$, of a 3D point. They are used for the details of rendering graphics and are typically set ahead of time. The number of vertical pixels, $N_y$, and the pixel aspect ratio par are predetermined by video format used by the camera. The optical center, ($u_o$, $v_o$) is determined as part of a calibration process. The remaining parameter, the vertical field of view $\phi$, is the parameter that varies dynamically.

The screen width, height and pixel aspect ratio are known constants for a particular video format: for example $N_x$=1920, $N_y$=1080 and par=1 for 1080i. The values of $u_o$, $v_o$ are determined as part of a calibration process. That leaves only the field of view, $\phi$, which needs to be specified before K is known.

The field of view is determined on a frame by frame basis using the following steps:
  use the measured value of the 2×Extender to determine the 2×Extender state;
  use the 2×Extender state to select a field of view mapping curve;
  Use the measured value of field of view, or equivalently zoom, and the particular field of view mapping curve determined by the 2×Extender state to compute a value for the nominal field of view;
  use the known 2×Extender state, and the computed value of the nominal field of view in combination with the measured focus value, to compute a focus expansion factor; and
  compute the actual field of view by multiplying the nominal field of view by the focus expansion factor.

One field of view mapping curve is required per possible 2×Extender state. The field of view mapping curves are determined ahead of time and are part of a calibration process.

One mapping between measured zoom, focus and 2×Extender and the focus expansion factor is required per possible 2×Extender state. The focus expansion factor mappings are determined ahead of time and are part of a calibration process.

The mapping (f) between undistorted screen coordinates to distorted screen coordinates (pixels) is not (in one embodiment) represented as a matrix. In one example, the model used accounts for radial distortion. The steps to compute the distorted screen coordinates from undistorted screen coordinates are:
  start with the inhomogenous screen pixels $s_u = (s_x, s_y)^T$
  compute the undistorted radial distance vector from a center of distortion, $s_o$ $\delta r = s_u - s_o$.

compute a scale factor $\alpha = 1 + k_1\|\delta r\| + k_2\|\delta r\|^2$
compute the inhomogeneous screen pixel vector $s_d = \alpha \delta r + s_o$
Some embodiments will also normalize the data.

The two constants $k_1$, $k_2$ are termed the distortion coefficients of the radial distortion model. An offline calibration process is used to measure the distortion coefficients, $k_1$, $k_2$, for a particular type of lens at various 2×Extender states and zoom levels. Then at run time the measured values of zoom and 2×Extender are used to determine the values of $k_1$ and $k_2$ to use in the distortion process. If the calibration process is not possible to complete, the default values of $k_1 = k_2 = 0$ are used and correspond to a camera with no distortion. In this case the distorted screen coordinates are the same as the undistorted screen coordinates.

The above discussion provides one set of examples for tracking objects and enhancing video from a mobile camera based on that tracking. The technology for accommodating mobile cameras can also be used in conjunction with other systems for tracking and enhancing video, such as the systems described in U.S. Pat. Nos. 5,912,700; 5,862,517; 5,917,553; 6,744,403; and 6,657,584. All five of these listed patents are incorporated herein by reference in their entirety.

The given technology for converting from 3D world coordinates of the event venue to the 2D coordinates of the camera plane (e.g., FIG. 3) can be used in the inverse form to determine the likely coordinates in the 3D world frame 109 based on pixel coordinates of the given camera once the camera's frame of reference has been determined as relative to the world frame 109.

Still referring to FIG. 6, when a same object of interest has its footage captured by multiple n*J-by-m*K pixels, high definition video cameras, the kept footages may be combined to reconstruct 3D models of the recorded action. In one embodiment, unit 640 performs 2D to 3D coordinates conversion for recognizable points found in plural ones of the kept footages. Unit 660 generates motion modeling curves that conform to the mapped three-dimensional (3D) coordinates of respective points in the kept footages. Unit 665 smooths and/or interpolates the curves so they comply with physical motion rules. A frames to curves associating unit 680 may be used to automatically logically link each frame from the kept footages to a corresponding segment portion of the developed curves so that, when an analyst wants to review the corresponding one or more footage frames that were used to produce an identified portion of the curve, the footage frames to curves associations can be used to retrieve the appropriate frames from the database 670. The specific attributes of each motion curve that may be of interest may vary from venue event to venue event and object of potential interest to the next. In one embodiment, the amount of potential energy ($mgZ_w$) versus kinetic energy ($0.5*m*(dZwdTw)^2$) stored in a given body at each instant of world time Tw may be of interest and/or minimums and maximums of such attributes may be of interest and the points of interest identifying unit 690 is configured to and used to automatically identify such points along respectively developed motion curves. The results produced by the points of interest identifying unit 690 are automatically stored in the database 670. Later, an analyst may call up such data or query for it using an appropriate database querying unit (e.g., 695) when searching for possible cross correlations between certain motion attributes of respective objects of potential interest (e.g., race cars) versus positive or negative outcomes (stored as 674) of the event where the positive or negative outcomes are also stored in the database and logically linked to respective kept footages.

Figure 7:
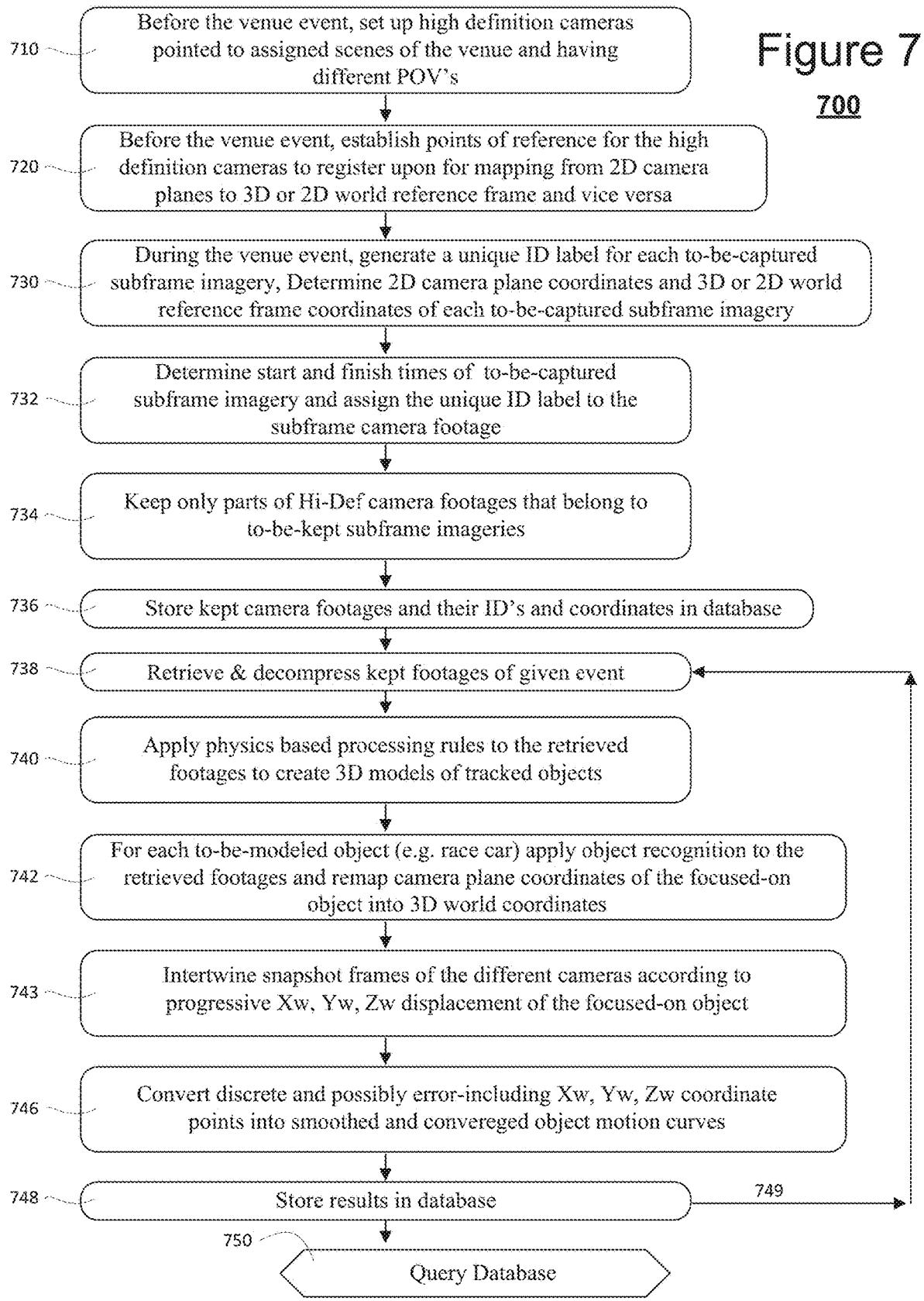
FIG. 7 depicts a flow chart of a process which among other things calibrates the high definition video cameras in accordance with the present disclosure.

Referring to FIG. 7, a method 700 that includes calibrating of an event venue and of the n*J-by-m*K pixels, high definition video cameras used to film the event venue is depicted. At step 710, before the sports event (or other venue event) takes place, workers set up the n*J-by-m*K pixels, high definition cameras in substantially fixed orientation as pointed to assigned scenes of the venue so that the cameras have respective different points of view (POV's). The area coverage cones 261-264 of FIG. 2 provide one example.

At step 720, and still before the sports event (or other venue event) takes place, various fiducials are set up to be in the viewable scenes (fields of view) of at least one of the high definition cameras and/or of one or more suspended or hovering object locators (e.g., drone 613 of FIG. 6). Such fiducials may include the on-guardrail beacons 611a-611c of FIG. 6 and/or any other placement markers whose 3D locations relative to a 3D 'world' frame of reference 609 can be established with a relatively high degree of accuracy (for example by means of surveying). In one embodiment, the 'world' frame of reference need not have a Zw axis and can instead by a 2D overhead mapping of the terrain as seen for example from the viewpoint of the one or more hovering drones, balloons or other overhead observing stations. The fiducials registration process establishes mappings between corresponding fiducial points (e.g., fixed into place within the event venue such as stationary beacons 611a-611c) and in camera-scene points that are found within the two-dimensional Sx by Sy image capture frames (the n*J-by-m*K pixels frames) of the respective high definition video cameras (e.g., 651, 652). Interpolation techniques may be used for points of the 3D or 2D real 'world' and points of the two-dimensional Sx by Sy image capture frames that are disposed between the registered points. During the live venue event (e.g., a car race), the pre-established mappings can be used to determine ahead of time the camera border area where an incoming object of potential interest is coming into view for that camera (e.g., the car in subframe 310h of FIG. 3) and when the object will be viewable within a wholly-in scene floating subframe. The pre-established mappings can also be used after footage is captured to determine where in the 2D or 3D 'world' frame of reference 609 an identified object is based on its location within the 2D image capture frames of the respective n*J-by-m*K pixels, high definition video cameras.

Step 730 takes place during the venue event (e.g., car race) when actual floating subframes (e.g., 310c, 310e-g) are being generated for in-camera-view objects of potential interest. Here a unique ID label is generated for each to-be-captured subframe area. At the same time at least one of the 2D camera plane coordinates and 3D or 2D world reference frame coordinates of each to-be-captured subframe imagery is also determined and logically linked with the unique ID label. Thus a mapping is provided for as between the footage ID labels and the in-camera and/or in real world coordinates occupied by the object of potential interest. A start and end time for each tracked and kept floating subframe is also mapped to the footage ID label in next step 732.

Even if an object of potential interest is inside a given camera's theoretical viewing range (e.g., scenery capturing ranges 261-264), view blocking other objects may come into play during the attempted capture of the target object's image to prevent actual capture of that imagery. For example, smoke may unexpectedly emerge from a vehicle that is closer to the camera and obscure viewing of a farther away target object. As another example, part of the racecourse may be obscured by fog or rain. In such cases it may not be worthwhile to keep all the footage (the full length thereof) of a floating subframe that tracks that farther away object. In step 732 it is determined what start and stop times should be assigned to the footages of each floating subframe. Here and as above, an expert knowledge base may be called upon to automatically make such decisions. Storage space is advantageously reduced if parts of the footage where the target object is largely obscured are intelligently discarded. More specifically, if it is determined that smoke or fog is greatly obscuring view in part of a camera's theoretical viewing range (e.g., scenery capturing ranges 261-264) then the part of the footage where the object of interest (e.g., race car) is inside that obscuring smoke and/or fog is automatically discarded. A respective, unique ID label is assigned to the kept part of the footage. The ID label may include an indication of how long that footage is and/or what it's real world start and stop times were.

In step 734, the not-to-be-kept imageries are discarded or marked as not-to-be-saved. In step 736, the to-be-kept floating subframe footages are stored in a database (e.g., 670 of FIG. 6) together with their assigned ID labels. The same labels are used also for other data stored in the database and belonging to the saved footages of imagery; for example the real world coordinates (e.g., Xw, Yw, Zw and Tw) of the object(s) of interest that are imaged in the kept footage. In one embodiment, image data and the like is digitally compressed when stored in the database.

Referring to step 738 of FIG. 7, after event footage is selectively kept and stored (optionally in compressed form and/or as shortened loopable video clips) and after the live action portion of the event is over or while it is in an intermission phase; additional information may be extracted from the kept footages (those of the floating subframes) and added to the database to enhance the quality of the information kept in the database. For example, event-modeling data may be developed by using plural kept footages of one or more of the target objects (e.g., race cars). A first step in this process may be one denoted in step 738, that being of identifying the footages of interest (e.g., based on car ID, driver ID, race dates or other such parameters) retrieving them from the database and decompressing them if need be.

In step 740, physics based processing rules are applied to the retrieved footages to create 3D models of identified ones of the tracked objects. Such applied rules may include laws of inertia, mass, energy and so forth that dictate how the tracked object most likely behaved during the real world event given the imagery taken of it from the respective camera's point of view. The mapping between world coordinates (e.g., Xw, Yw, Zw, Tw) and camera image plane coordinates as performed in step 720 may be used within this process. In step 734 the data derived from images obtained for a given object but from different points of view (POV's) are intertwined to develop a physics-based narrative that takes into account the different points of view. Step 746 uses weighted curve fitting and interpolation to converts the discrete snapshots of the different cameras into a time-continuous and more cohesive description of what happened to the targeted object of interest (e.g., race car). For example, camera shots taken from closer cameras and/or better calibrated cameras may be given greater weight than those farther away or having suspect calibration. Object motion describing curves that are smooth in accordance with laws of physics are created out of this and stored back into the database (step 748) together with summaries that describe highlights of the saved data (e.g., minimum and maximum vehicle speeds, minimum and maximum potential energy points, etc.).

Looping path 749 indicates that the data enhancement process is carried out many times for different objects of interest and/or different races and venues. At step 750, the enhanced data of the database is mined to discover various correlations of potential interest.

It is to be understood that various ones of the functionalities described herein may be implemented using one or more processor readable storage devices having processor readable code embodied thereon for programming one or more processors to perform the processes described herein. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

Accordingly, a method has been disclosed for providing substantially stationary unmanned and high definition video cameras that are each operated in an automated manner to emulate or substitute in place of a plurality of lower definition and manned video cameras that are physically panned by their respective camera operators to track in-venue objects of potential interest. Costs are reduced and reliability is increased because software-controlled virtual operators replace the human camera operators, software-controlled virtual cameras (in the form of the floating subframes) replace the emulated real cameras and only one unmoving camera mount and cable interconnection replace the emulated plural ones of gimbaled camera mounts for the emulated real cameras and the many cable interconnections for the emulated real cameras.

More specifically, a method is provided for emulating (without the drawbacks of relying on attention-limited, human operators) one or more manned and pannable video cameras each having a relatively low resolution and each being configured to pan across a predetermined first scenery area of a pre-specified and relatively large event space so as to, for example, track a moving object of potential interest as it passes through the predetermined first scenery area, the pre-specified and relatively large event space having a plurality of scenery areas including the first scenery area and the relatively large event space being large enough to require more than two of the relatively low resolution video cameras for covering all the scenery areas of the event space, where the method comprises: (a) providing an unmanned, continuously filming, and substantially fixedly aimed first video camera having an image capture resolution of n*J-by-m*K pixels, where J-by-K pixels is the highest resolution of any of the substituted-for video cameras, where J and K are integers greater than one, and where n and m are multiplying values each equal to or greater than one except that at least one of n and m is equal to or greater than two, the substantially fixedly aimed first video camera being aimed at and covering with its image capture resolution, the predetermined first scenery area; (b) automatically determining what portions of the n*J-by-m*K pixels imagery captured by the substantially fixedly aimed first video camera are to be kept as providing respective views of objects of potential interest within the first scenery area and what portions of the n*J-by-m*K pixels imagery are to be discarded due to their not providing respective views of objects of potential interest; and (c) automatically discarding the portions of the n*J-by-m*K pixels imagery that have been automatically determined to not provide respective views of objects of potential interest.

Moreover, a machine-implemented system is provided for emulating or substituting for one or more manned and pannable video cameras each having a relatively low resolution and each being configured to pan across a predetermined first scenery area of a pre-specified and relatively large event space so as to, for example, track a moving object of potential interest as it passes through the predetermined first scenery area, the pre-specified and relatively large event space having a plurality of scenery areas including the first scenery area and the relatively large event space being large enough to require more than two of the relatively low resolution video cameras for covering all the scenery areas of the event space, where the machine-implemented system comprises: (a) an unmanned and substantially fixedly aimed first video camera having an image capture resolution of n*J-by-m*K pixels, where J-by-K pixels is the highest resolution of any of the substituted-for video cameras, where J and K are integers greater than one, and where n and m are multiplying values each equal to or greater than one except that at least one of n and m is equal to or greater than two, the substantially fixedly aimed first video camera being aimed at and covering with its image capture resolution, the predetermined first scenery area; (b) a keep or discard determining unit configured to automatically determine what portions of the n*J-by-m*K pixels imagery captured by the substantially fixedly aimed first video camera are to be kept as providing respective views of objects of potential interest within the first scenery area and what portions of the n*J-by-m*K pixels imagery are to be discarded due to their not providing respective views of objects of potential interest; and (c) a footage buffer configured to temporarily store the n*J-by-m*K pixels imagery captured by the substantially fixedly aimed first video camera, and from which are discarded the portions of the n*J-by-m*K pixels imagery that are determined as those that are to be discarded.

Additionally, an event space is provided so as to be configured for use by one or more in-the-space participating action objects of a pre-specified sport or other action event, the event space being a pre-specified and relatively large event space having a plurality of scenery areas including a predetermined first scenery area in which the in-the-space participating action objects may perform corresponding actions of potential interest, the first scenery area being relatively large and thereby ordinarily requiring use of one or more pannable low resolution video cameras to track a moving object of potential interest as it passes through the predetermined first scenery area; where the event space is equipped with: (a) an unmanned and substantially fixedly aimed first video camera having an image capture resolution of n*J-by-m*K pixels, where J-by-K pixels is the highest resolution of any of the one or more pannable low resolution video cameras, where J and K are integers greater than one, and where n and m are multiplying values each equal to or greater than one except that at least one of n and m is equal to or greater than two, the substantially fixedly aimed first video camera being aimed at and covering with its image capture resolution, the predetermined first scenery area; and (b) a keep or discard determining unit configured to automatically determine what portions of the n*J-by-m*K pixels imagery captured by the substantially fixedly aimed first video camera are to be kept as providing respective views of objects of potential interest within the first scenery area and what portions of the n*J-by-m*K pixels imagery are to be discarded due to their not providing respective views of objects of potential interest.

The foregoing detailed description of the present disclosure of invention has been presented for purposes of illustration and description. It is not intended to be exhaustive or to limit the present teachings to the precise forms disclosed. Many modifications and variations are possible in light of the above teachings. The described embodiments were chosen in order to best explain the principles of the disclosure and its practical application, to thereby enable others skilled in the art to best utilize the teachings in various embodiments and with various modifications as are suited to the particular use contemplated. It is intended that the scope of the disclosure include the claims appended hereto.

The invention claimed is:

1. A method for automatically tracking and analyzing imagery data and telemetry data of at least one vehicle on a racetrack comprising:
    providing a plurality of video cameras positioned around the racetrack;
    providing a video event management system including a processor, a memory, and a database;
    the video event management system receiving video imagery from the plurality of video cameras and storing the video imagery and stills of the video imagery;
    obtaining telemetry data from at least one vehicle;
    selecting imagery data of the at least one vehicle based on the telemetry data of the at least one vehicle;
    based on the imagery data, determining vehicle dynamics, including real-world positions, real-world velocities, camera image positions, and/or camera image velocities of both the at least one vehicle and at least one other object, wherein the at least one other object is at least one person, at least one other vehicle, or at least one group of vehicles;
    deriving a quantified event score for the at least one vehicle through application of rules to the imagery data and/or the telemetry data of the at least one vehicle;
    generating at least one floating subframe within a full frame of a first video camera of the plurality of video cameras encompassing the at least one vehicle and/or a vehicle path if the quantified event score of the at least one vehicle is greater than a threshold event score;
    determining an imminent vehicle entry into a field of view of a second video camera of the plurality of video cameras and based on the telemetry data and the vehicle dynamics;
    determining a direction and a point of entry of the at least one vehicle into the field of view of the second video camera of the plurality of video cameras;

generating at least one second floating subframe based on the imminent vehicle entry;

retrieving camera image velocity data and camera image position data of the at least one floating subframe and transforming the camera image velocity data and the camera image position data based on an angle and a position of the second video camera of the plurality of video cameras such that the at least one floating subframe is operable to continuously and smoothly track the at least one vehicle from the at least one floating subframe and the at least one second floating subframe;

adjusting subframe coordinates of the at least one floating subframe based on the vehicle dynamics, wherein the adjusting the subframe coordinates comprises setting a tracking velocity for the subframe coordinates to match a velocity and a direction of the at least one vehicle based on the camera image positions and the camera image velocities of the at least one vehicle;

linking the at least one floating subframe to the video imagery and the stills of the video imagery;

storing video imagery data and stills data for a specific subframe based on the quantified event score;

wherein the application of the rules includes adding a numerical value to the quantified event score upon a determination of a celebrity status of the at least one vehicle driver.

2. The method of claim 1, further comprising detecting the imagery data, wherein the detecting the imagery data of the at least one vehicle further comprises using sound detection, magnetic object detection, near field electromagnetic detection, or image outline detection.

3. The method of claim 1, wherein the determining the vehicle dynamics, including the real-world positions, the real-world velocities, the camera image positions, and the camera image velocities further comprises converting three-dimensional (3D) world coordinates to 3D camera image coordinates, converting the 3D camera image coordinates to two-dimensional (2D) camera image undistorted screen coordinates, and converting the 2D camera image undistorted screen coordinates to 2D distorted screen coordinates, and wherein the 2D distorted screen coordinates have been converted from the 2D camera image undistorted screen coordinates in order to account for camera or lens distortion using intrinsic and extrinsic sensors on the camera and/or reference marks.

4. The method of claim 1, wherein the plurality of video cameras are unmanned and are fixed with stationary fields of view.

5. The method of claim 1, further comprising constructing the subframe coordinates with the camera image positions of the at least one vehicle centered within the subframe coordinates.

6. The method of claim 1, further comprising discarding excess video imagery data and excess stills data of the linked video imagery and the linked stills of the video imagery based on the quantified event score.

7. A system for automatically tracking and analyzing imagery data and telemetry data of at least one vehicle on a racetrack comprising:

a plurality of video cameras positioned around the racetrack with a combined field of view of the racetrack; and a video event management system including a processor, a memory, and a database;

wherein the video event management system is operable to:

receive video imagery from the plurality of video cameras;

store the video imagery and stills of the video imagery;

obtain telemetry data of the at least one vehicle;

select imagery data of the at least one vehicle based on the telemetry data of the at least one vehicle;

based on the imagery data and the telemetry data, determine vehicle dynamics, including real-world positions, real-world velocities, camera image positions, and/or camera image velocities of both the at least one vehicle and at least one other object, wherein the at least one other object is at least one person, at least one other vehicle, or at least one group of vehicles;

derive a quantified event score for the at least one vehicle through application of rules to the imagery data and the telemetry data of the at least one vehicle, wherein the application of the rules includes comparing one or more first celebrity status attributes to one or more second celebrity status attributes of a second group of one or more objects of potential interest on the racetrack, wherein the second group of one or more objects of potential interest includes at least one second vehicle, and wherein the application of the rules includes adding a numerical value to the quantified event score upon a determination of a celebrity status of the at least one vehicle driver;

generate at least one floating subframe within a full frame of a video camera encompassing the at least one vehicle or vehicle path, wherein the video camera is selected from the plurality of video cameras;

adjust subframe coordinates based on the vehicle dynamics; and link the at least one floating subframe to the video imagery and the stills of the video imagery.

8. The system of claim 7, wherein the adjusting the subframe coordinates comprises setting a tracking velocity for the subframe coordinates to match a velocity and a direction of the at least one vehicle based on the camera image positions and the camera image velocities of the at least one vehicle.

9. The system of claim 7, wherein the at least one floating subframe includes metadata indicating subframe metadata and vehicle metadata, including the quantified event score, the vehicle dynamics, a subframe resolution, and subframe coordinates.

10. The system of claim 7, further comprising at least one data acquisition and positioning system including a Global Positioning System (GPS) antenna and a telemetry antenna attached to the at least one vehicle, wherein the video event management system provides the telemetry data of the at least one vehicle.

11. The system of claim 7, wherein the video imagery and the stills of the video imagery includes video imagery data and stills data for a specific subframe based on the quantified event score.

12. The system of claim 7, wherein the video event management system is further operable to discard excess video imagery data and excess stills data of the linked video imagery and the linked stills of the video imagery based on the quantified event score.

13. A method for automatically tracking and analyzing imagery data and telemetry data of at least one vehicle on a racetrack comprising:

providing a plurality of video cameras positioned around the racetrack;

providing a video event management system including a processor, a memory, and a database;

the video event management system:
- receiving video imagery from the plurality of video cameras;
- storing the video imagery and stills of the video imagery;
- obtaining telemetry data from at least one data acquisition and positioning system of the at least one vehicle;
- selecting imagery data of the at least one vehicle based on the telemetry data of the at least one vehicle;
- based on the imagery data and the telemetry data, determining vehicle dynamics, including real-world positions, real-world velocities, camera image positions, and/or camera image velocities of both the at least one vehicle and at least one other object, wherein the at least one other object is at least one person, at least one other vehicle, or at least one group of vehicles;
- deriving a quantified event score for the at least one vehicle by application of an algorithm comprising rules to the imagery data and/or the telemetry data of the at least one vehicle on the racetrack, wherein the rules include adding a numerical value to the quantified event score upon a determination of a celebrity status of the at least one vehicle driver;
- generating at least one floating subframe within a full frame of a video camera encompassing the at least one vehicle or vehicle path, wherein the video camera is selected from the plurality of video cameras;
- adjusting subframe coordinates based on the vehicle dynamics;
- linking the at least one floating subframe to the video imagery and the stills of the video imagery; and
- storing video imagery data and stills data for a specific subframe based on the quantified event score.

14. The method of claim 13, wherein the at least one data acquisition and positioning system includes a Global Positioning System (GPS) antenna and a telemetry antenna.

15. The method of claim 13, wherein the plurality of video cameras are fixed with stationary fields of view.

16. The method of claim 13, wherein the rules define an add, subtract, multiply, or divide operation for the quantified event score of the at least one vehicle, wherein the pre-set rules include weighted operations for each of the vehicle position, the vehicle operations status, the driver identity, and the events.

17. The method of claim 13, wherein the adjusting the subframe coordinates further comprises setting a tracking velocity for the subframe coordinates to match a velocity and a direction of the at least one vehicle based on the camera image positions and the camera image velocities of the at least one vehicle.

18. The method of claim 13, further comprising discarding excess video imagery data and excess stills data of the linked video imagery and the linked stills of the video imagery based on the quantified event score.

19. The method of claim 13, wherein the at least one floating subframe includes metadata indicating subframe metadata and vehicle metadata, including the quantified event score, the vehicle dynamics, a subframe resolution, and subframe coordinates.

* * * * *